(12) United States Patent
Gupta et al.

(10) Patent No.: US 6,274,293 B1
(45) Date of Patent: Aug. 14, 2001

(54) METHOD OF MANUFACTURING FLEXIBLE METALLIC PHOTONIC BAND GAP STRUCTURES, AND STRUCTURES RESULTING THEREFROM

(75) Inventors: Sandhya Gupta, Bloomington, MN (US); Gary L. Tuttle, Ames, IA (US); Mihail Sigalas, Ames, IA (US); Jonathan S. McCalmont, Ames, IA (US); Kai-Ming Ho, Ames, IA (US)

(73) Assignee: Iowa State University Research Foundation, Ames, IA (US)

( * ) Notice: Subject to any disclaimer, the term of this patent is extended or adjusted under 35 U.S.C. 154(b) by 0 days.

(21) Appl. No.: 09/086,790

(22) Filed: May 28, 1998

Related U.S. Application Data

(60) Provisional application No. 60/048,048, filed on May 30, 1997.

(51) Int. Cl.[7] ........................................ G03F 7/00
(52) U.S. Cl. .................. 430/315; 430/320; 430/329; 427/124
(58) Field of Search .................... 430/320, 311, 430/315, 324, 329; 427/566, 124, 372.2

(56) References Cited

U.S. PATENT DOCUMENTS

| | | | |
|---|---|---|---|
| 4,687,541 | * | 8/1987 | Penney ................. 156/643 |
| 5,137,751 | * | 8/1992 | Burgess ................ 427/123 |
| 5,403,700 | * | 4/1995 | Heller ................. 430/311 |
| 5,578,976 | * | 11/1996 | Yao ..................... 333/262 |
| 5,609,995 | * | 3/1997 | Akram .................. 430/327 |

OTHER PUBLICATIONS

E. Yablooivitch, "Inhibited Spontaneous Emission in Solid State Physics and Electronics", Physics Review Letters, vol. 58, pp. 2059–2062, 1987.

Review articles from the Journal of Optical Society of America B, vol 10, No. 2, 1993.

E. Yablonovitch, T.J. Gmitter, "Donor and Acceptor Modes in Photonic Bank Structure", Physics Review Letters, vol. 67, pp. 3380–3383, 1991.

A.A. Maradudin,A.R. McGurn, "Photonic band structures of two–dimensional dielectric media"; Physics Review B, vol. 48, pp. 17576–17579, 1993.

(List continued on next page.)

*Primary Examiner*—Kathleen Duda
(74) *Attorney, Agent, or Firm*—Leydig,Voit & Mayer,Ltd.

(57) ABSTRACT

A method of manufacturing a flexible metallic photonic band gap structure operable in the infrared region, comprises the steps of spinning on a first layer of dielectric on a GaAs substrate, imidizing this first layer of dielectric, forming a first metal pattern on this first layer of dielectric, spinning on and imidizing a second layer of dielectric, and then removing the GaAs substrate. This method results in a flexible metallic photonic band gap structure operable with various filter characteristics in the infrared region. This method may be used to construct multi-layer flexible metallic photonic band gap structures. Metal grid defects and dielectric separation layer thicknesses are adjusted to control filter parameters.

38 Claims, 25 Drawing Sheets

OTHER PUBLICATIONS

R.D. Smith, S. Schultz, N. Kroll, M. Sigalas, K.M. Ho, C.M. Soukoulis, "Experimental and theoretical results for a two–dimensional metal photonic band–gap cavity", Applied Physics Letters, vol. 65, pp. 645–647, 1994.

M.M. Sigalas, C.T. Chan, K.M. Ho, C.M. Soukoulis, "Metallic photonic band–gap materials", Physical Review B, vol. 52, pp. 1174–11751, 1995.

E.R. Brown, O.B. McMahon, "Large electromagnetic stop bands in metallodielectric photonic crystals", Applied Physics Letters, vol. 67, pp. 2138–2140, 1995.

T.K. Wu, "Frequency Selective Surface and Grid Array", Table of Contents and chapters 3 and 6, John Wiley and Sons, Inc. New York, 1995.

T. Schimert, M.E. Koch, "Analysis of scattering from frequency–selective surfaces in the infrared", Journal of Optical Society of America A, vol. 7, pp. 1545–1553, 1990.

P. G. Huggard, M. Meyringer, A. Schilz, K. Goller, W. Prettl, "Far–infrared bandpass filters from perforated metal screens", Applied Optics, vol. 33, pp. 39–41, 1994.

K. M. Ho, C.T. Chan, C.M. Soukoulis, "Existence of Photonic Band Gap in Periodic Dielectric Structures," Physics Review Letters, vol. 65, pp. 3152–3155, 1990.

E. Yablonovitch, T.J. Gmitter, K.M. Leung, "Photonic Band Structure: The Face–Centered–Cubic Case Employing Nonspherical Atoms," Physical Review Letters, vol. 67, pp.2295–2298, 1991.

C. C. Cheng, A. Scherer, R.C. Tyan, Y. Fainman, G. Witzgall, E. Yablonovitch, "New fabrication techniques for high quality photonic crystals", Journal of Vacuum Science Technology, p. 2764, 1997.

K. M. Ho, C.T. Chan, C.M. Soukoulis, R. Biswas, M. Sigalas, "Photonic Band Gaps in Three Dimensions: New Layer–by–Layer Periodic Structures," Solid State Communications, vol. 89, pp. 413–416, 1994.

E. Ozbay, A. Abeyta, G. Tuttle, M. Tringides, R. Biswas, C.T. Chan, C.M. Soukoulis, K.M. Ho, "Measurement of a three–dimensional photonic band gap in a crystal structure made of dielectric rods," Physical Review B, vol. 50, pp. 1945–1948, 1994.

E. Ozbay, E. Michel, G. Tuttle, R. Biswas, M. Sigalas, K.M. Ho, "Micromachined millimeter–wave photonic band–gap crystals," Applied Physics Letters, vol. 64, pp. 2059–2061, 1994.

D. F. Sievenpiper, M. Sickmiller, E. Yablonovitch, "3D Wire Mesh Photonic Crystals," Physical Review Letters, vol. 76, pp. 2480–2483, 1996.

J. S. McCalmont, M. Sigalas, G Tuttle, K.M. Ho, C.M. Soukoulis, "A layer–by–layer metallic photonic band–gap structure," Applied Physics Letters, vol. 68, pp. 2759–2761, 1996.

S. Gupta, G. Tuttle, M. Sigalas, K.M. Ho, "Infrared filters using metallic photonic band gap structures on flexible substrates," Applied Physics Letters, vol. 71, pp. 2412–2414, 1997.

K. A. Mcintosh, L.J. Moaoney, K.M. Molvar, O.B. McMohan, S. Verghese, M. Rothchild, E.R. Brown, "Three–dimensional metallodielectric photonic crystals exhibiting resonant infrared stop bands," Applied Physics Letters, vol. 70, pp. 2937–2939, 1997.

D. W. Porterfield, J.L. Hesler, R. Densing, E.R. Mueller, T.W. Crowe, R.M. Weikle II, "Resonant metal–mesh bandpass filters for the far infrared," Applied Optics, vol. 33, pp. 6046–6052, 1994.

J. B. Pendry, A. MacKinnon, "Calculation of Photonic Disperison Relations," Physics Review Letters, vol. 69, pp. 2772–2775, 1992.

E. Ozbay, G. Tuttle, M. Sigalas, C. M. Soukoulis, K.M. Ho, "Defect structures in a layer–by–layer photonic band–gap crystal," Physical Review B, vol. 51, pp. 13961–13965, 1995.

M. Rebbert, P. Isaacson, J. Fisher, M.A. Greenhouse, J. Grossman, M. Peckerar, H.A. Smith, "Microstructure technology for fabrication of metal–mesh grids", Applied Optics, vol. 33, pp. 1286–1292, (1994).

M.M. Sigalas, C.M. Soukoulis, E.N. Economou, C.T. Chan and K.M. Ho, "Photonic band gaps and defects in two dimensions: Studies of the transmission coefficient", Physics Review B, vol. 48, No. 19, p. 14121, (1993).

M.M. Sigalas, C.M. Soukoulis, C.T. Chan and K.M. Ho., "Electromagnetic–wave propagation through dispersive and absorptive photonic–band–gap materials", Physics Review B, vol. 49, No. 16, p. 11080, (1994).

* cited by examiner

| Mask Set | Lattice Constant, $a$ (μm) | Line Width, $w$ (μm) |
|---|---|---|
| Set A | 32 | 5 |
| Set B | 16 | 2.5 |
| Set C | 11 | 1.5 |

| Feature | Fabricated structure | Calculated structure |
|---|---|---|
| Line width | 2.5μm | 3.2μm |
| Inter-layer separation | 11μm | 11.2μm |
| Metal layer thickness | 0.2μm | 0.8μm |

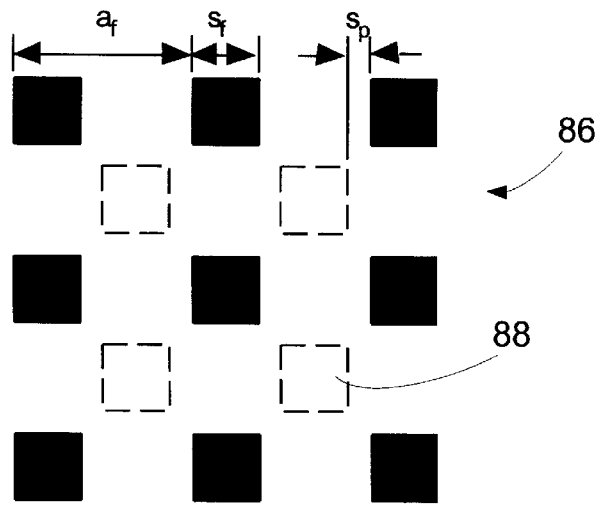
FIG. 34
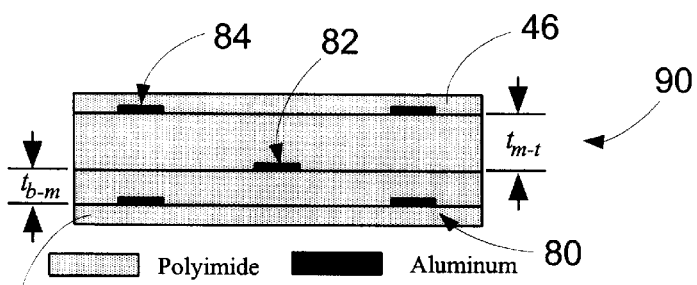
FIG. 36
| Sample No. | $t_{b-m}$ (μm) | $t_{m-t}$ (μm) |
|---|---|---|
| X | 11 | 20 |
| Y | 11 | 11 |
| Z | 11 | 5 |
FIG. 37

US 6,274,293 B1

METHOD OF MANUFACTURING FLEXIBLE METALLIC PHOTONIC BAND GAP STRUCTURES, AND STRUCTURES RESULTING THEREFROM

This application claims the benefit of U.S. Provisional Application Ser. No. 60/048,048, filed May 30, 1997.

This invention was developed with government assistance under DOE Contract No. W-7405-Eng-82 and DOC Contract No. ITA 87—02. The government may have certain rights in this invention.

TECHNIAL FIELD OF THE INVENTION

This invention relates to electromagnetic wave filtering devices and methods of manufacturing same, and more particularly to a flexible metallic photonic band gap structure suitable for filtering in the infrared frequency region and a method of manufacturing same.

BACKGROUND OF THE INVENTION

Photonic band gap (PBG) structures are periodic dielectric structures that exhibit frequency regions in which electromagnetic waves cannot propagate. The idea for PBGs was first proposed by Eli Yablonovitch in 1987. The interest in PBGs arises from the fact that photon behavior in a dielectric structure is similar to the behavior of electrons in a semiconductor. The periodic arrangement of atoms in a semiconductor lattice opens up forbidden gaps in the energy band diagram for the electrons. Similarly in PBG structures, the periodic placement of dielectric "atoms" opens up forbidden gaps in the photon energy bands. This analogy can be easily seen in the Schrödinger equation (1) (see below) of a propagating electron wave in a potential, V(r) and equation (2), which is derived from the Maxwell's equations, for the electric field amplitude E(r) propagating a monochromatic electromagnetic wave of frequency ω in an inhomogeneous but nondispersive dielectric media as shown in the following equations:

$$\left\{-\frac{\hbar^2}{2m}\nabla^2 + V(r)\right\}\psi(r) = E\psi(r), \tag{1}$$

$$-\nabla^2 E(r) + \nabla(\nabla \cdot E(r)) - \frac{\omega^2}{c^2}\varepsilon_{fluc}(r)E(r) = \varepsilon_0 \frac{\omega^2}{c^2}E(r). \tag{2}$$

Here, m is the electron rest mass and $\psi(r)$ is the scalar wave function in equation (1). In equation (2), the total dielectric is separated as $$\epsilon(r)=\epsilon_o+\epsilon_{fluc}(r), \tag{3}$$

where $\epsilon_o$ is the average dielectric constant value and $\epsilon_{fluc}(r)$ defines the spatially fluctuating part. The latter plays a role analogous to the V(r) in the Schrödinger equation, and the quantity $\epsilon_o \omega^2 c^2$ is equivalent to the energy eigenvalue E of the Schrödinger equation.

The idea of PBGs has led to the proposal of many novel applications at optical wavelengths, such as thresholdless lasers, single-mode light-emitting-diodes and optical wave guides. In addition, PBGs are already being used in the millimeter and microwave regimes, where the applications include efficient reflectors, antennas, filters, sources and wave guides. They have also found possible applications as infrared filters. As a result, they have been extensively studied in the last few years.

The PBG structures behave as ideal reflectors in the band gap region. Depending on the directional periodicity of these dielectric structures, the band gap may exist in 1-D, 2-D or all the three directions.

One of the unique features of PBG structures is their scaleable characteristic from microwaves to optical frequency. This can be explained better by going back to Maxwell's equations. Equation (2) listed earlier is derived from Maxwell's equations which can be rewritten in a magnetic field vector form as:

$$\nabla \times \left(\frac{1}{\varepsilon(r)}\nabla \times H(r)\right) = \left(\frac{\omega}{c}\right)^2 H(r), \tag{4}$$

where H(r) is the magnetic field vector. A new dielectric constant is defined, $$\epsilon'(r)=\epsilon(r/s)=\epsilon(r') \tag{5}$$

where s is some scalar parameter. Basically the dielectric has been compressed or expanded by this scalar value s. Now defining a new variable, r'=sr and ∇'=∇/s, equation (4) can be rewritten as:

$$s\nabla' \times \left(\frac{1}{\varepsilon(r'/s)}s\nabla' \times H(r'/s)\right) = \left(\frac{\omega}{c}\right)^2 \times H(r'/s) \tag{6}$$

which can also be written as $$\nabla' \times \left(\frac{1}{\varepsilon'(r')}\nabla' \times H(r'/s)\right) = \left(\frac{\omega}{cs}\right)^2 \times H(r'/s) \tag{7}$$

Here, $\epsilon(r'/s)=\epsilon'(r')$ and this allows return to the master equation with mode profile H'(r')=H(r'/s) and frequency ω'=ω/s. If the mode profile is studied after changing the length scale by a factor of s, the old mode and its frequency simply needs to be scaled by the same factor. The solution of a problem at one length scale determines the solutions at all other scales.

The modes of photonic crystals can be tested at microwave frequencies with bigger dimension and because of scalability of the structure it is ensured that the electromagnetic properties will not change at optical frequencies with submicron dimensions.

Now studying the effect of change in the dielectric configuration, suppose that a new system has a dielectric constant $\epsilon'(r)=\epsilon(r)/s^2$. Therefore, $$\nabla \times \left(\frac{1}{s^2\varepsilon'(r)}\nabla \times H(r)\right) = \left(\frac{\omega}{c}\right)^2 \times H(r) \tag{8}$$

or, $$\nabla \times \left(\frac{1}{\varepsilon'(r)}\nabla \times H(r)\right) = \left(\frac{s\omega}{c}\right)^2 \times H(r) \tag{9}$$

The harmonic modes of the system are unchanged but all the frequencies have been scaled up by a factor of s. For example, if the dielectric constant is multiplied by a factor of ¼, the mode patterns are unchanged but the frequencies are doubled. So, by changing the dielectric constant or changing the dimensions of the structure, the electromagnetic properties can be scaled anywhere from microwave to optical frequencies. Similar to the impurity doping in a semiconductor, localized electromagnetic modes can be created in the band gap region of PBG structures by introducing defects that disturb the periodicity of the structure. This can be achieved by adding extra material to the crystal, which acts like a donor atom of a semiconductor. The defect gives rise to donor modes which have their origin at the bottom of the conduction band. A defect can also be introduced by removing a part of the material, thus creating states similar to the semiconductor behavior with acceptor atoms. Experiments have shown that the acceptor modes, acting like cavities, are of greater importance with their highly localized and single-mode cavity characteristics. In photonic crystals with defects, the transmission spectrum is changed by the presence of a narrow transmission peak within the band gap. Defect peaks with quality factors in the range of 1000–2000 have been experimentally demonstrated.

Much of the PBG research effort up to this point has focused on the use of purely dielectric material to construct the PBG structure. Metallic photonic band gap (MPBG) structures have received relatively little attention due to perceived problems relating to lossiness in the metal components.

However, MPBG structures do have some distinct advantages over their all dielectric counterparts, and these advantages have garnered MPBGs more attention recently. MPBG structures offer the potential of lighter weight, reduced size and lower materials and fabrication costs when compared to all dielectric structures. The use of metal can also lead to fundamentally different PBG characteristics. For an interconnected mesh structure, the stopbands of the MPBG will extend from zero frequency up to some cut-off frequency, which is determined by the periodicity of the structure. Such behavior is in contrast to purely dielectric PBG structures, which typically have stop bands extending over relatively narrow ranges of frequencies. On the other hand, it has also been shown that MPBG structures consisting of isolated metal patches have a band-stop behavior very similar to the all dielectric photonic band gap structures.

As stated above, the idea of photonic band gaps was first proposed by Yablonovitch in 1987. The idea is analogous to the behavior of electrons in a crystal lattice. The electromagnetic waves propagating in a structure with a periodically modulated dielectric constant are organized in "photonic bands" which are separated by "gaps" where propagating states are forbidden.

Following the inception of this idea, various lattice geometries were studied to find a periodic structure that would exhibit a photonic band gap in all the directions. After several unsuccessful attempts in finding the right lattice geometry using "trial-and-error" techniques, Ho et al. at Iowa State University were first to predict the existence of a complete band gap in a periodic dielectric structure arranged in diamond lattice geometry. Diamond lattice structures were calculated to have large gaps for refractive index ratio between the two dielectrics as low as two.

With these findings, Yablonovitch et al. fabricated the first three-dimensional photonic band gap structure 10 as illustrated in FIG. 1. The structure was arranged in a periodic face-centered-cubic lattice, but with cylindrical air holes 12, giving it an over-all diamond lattice structure. The periodicity in the structure was achieved by drilling holes 120° apart and at 35° from the z-axis into a dielectric slab as shown by rods 14 in FIG. 1. This experimental structure 10 exhibited a full 3-D photonic band gap. It had a forbidden gap from 13 to 16 GHz with 10 dB attenuation per unit cell.

However, the structure 10 has proven difficult to fabricate at optical frequencies where feature sizes are less than one micron. Chemically assisted ion beam etching technology has been used to etch the holes. It has been found difficult to maintain the linearity and hole size as the etching depth increases. This adversely affects the periodicity of the structure and hence the photonic band gap. The midgap optical reflectivity is found to be very sensitive to structural errors in the photonic crystal.

After the initial verification of the existence of photonic band gap, there was an increased effort to find new structures that could be more easily fabricated. Another structure that exhibited a complete band gap was suggested by Ho et al. and fabricated by Ozbay et al. from Iowa State University. This new "layer-by-layer" structure 16 illustrated in FIG. 2 was fabricated by stacking layers of equally spaced round or rectangular rods 18. The first layer-by-layer structure 16 was fabricated using alumina rods with dielectric constant $\epsilon=9.6$ glued together to form a face-centered-tetrahedral symmetry. This structure 16 was found much easier to scale down in size. Standard silicon micro-machining techniques have been used to scale down the size of this layer-by-layer PBG structure 16 and make it operational up to 500 GHz at Iowa State University. Other laser prototyping methods have been used to fabricate this structure to allow operation to about 2 THz.

Fabrication of PBG structures has been mostly studied using frequency independent dielectric materials with positive dielectric constants where the possible problems related to absorption can be neglected. However, recent work on PBG structures using metals has shown good results for operating frequencies much lower than the plasma frequency of the metal. Although metals are quite lossy at optical frequencies, they act as nearly perfect reflectors at lower frequencies. The initial interest in metallic photonic band gap (MPBG) structures arose from the fact that they show higher attenuation with fewer layers as compared to their all dielectric counterparts. These structures are much more compact, lighter weight and can be fabricated at a reduced cost as compared to dielectric structures.

The first MPBG structure with a complete 3-D band gap was reported by Yablonovitch et al. in 1996. The MPBG structure 20 had a geometry resembling covalently bonded diamond as shown in FIG. 3A. Copper wire strips 22 shown in FIG. 3B snap together to make the diamond geometry. The transmission spectrum of this structure did show a forbidden gap similar to a purely dielectric structure centered about $v_o$, corresponding to the lattice constant of the structure. But this forbidden gap does not extend in all the directions. In addition to this forbidden gap, this structure 20 shows a new 3-D band gap that extends from zero to a cutoff frequency of $\sim(\frac{1}{2})v_o$. This high pass spectrum of the structure can be observed in all the directions and is called the metallicity gap. The structure 20 shown in FIG. 3A has a high pass cutoff frequency of 6.5 GHz. The effect of introducing defects into the structure was also studied in detail. However, because of the complex geometry of the structure it has been difficult to scale down its size to allow operation at higher frequencies.

FIG. 4 illustrates another layer-by-layer structure 24 for metallic photonic crystal fabricated at Iowa State University by McCalmont et al. which has shown very good results. The structure 24 is built by stacking three layers of square metallic grids 26, 28, 30 aligned to each other and separated by a dielectric medium 32, 34 as shown in FIG. 4. The transmission characteristic of the structure 24 exhibits a metallicity gap with as few as three metal layers 26, 28, 30 in the stacking direction. The location of the band edge is a function of lattice constant, width of the metal wire grid, and the refractive index of the dielectric material. This structure 24 was fabricated on a duroid ($\epsilon r=1.5$) printed circuit board 36 with copper laminations on both sides. One side of the copper cladding was patterned with the grid pattern 26 using standard photolithography techniques and the backside copper was completely removed. The structures were fabricated to operate in 75–110 GHz frequency range.

A change in periodicity of the center grid 28 creates a defect mode in the band gap region, effectively forming a bandpass characteristic. The size of the defect determined the location of the defect mode frequency in the band gap. The response of the structure is virtually unchanged over a wide range of incident angles, but it is not a fully three-dimensional structure. Both the transmission and reflection characteristic of the defect peak was measured. The reflected peak was much sharper than the transmission peak with a maximum measured quality factor of 461 in the reflection measurements.

McIntosh et al. studied a lattice geometry where metallic atoms were located on a three-dimensional oriented face-centered-cubic (FCC) lattice, and the sites were isolated from each other. Initially they studied the characteristics of this structure in the microwave region and then extended this concept to the infrared. The metallic FCC structure was embedded in a polymer and supported on a silicon substrate. This group fabricated two different sets of arrays.

The first set had its lattice sites occupied with square metal patches while the other set of arrays had circular patches. The lattice constants of different structures ranged from 2 to 4 $\mu$m. These structures show band gap behavior that is very similar to the dielectric PBGs. The circular patch structures showed frequency gaps at 3650 cm$^{-1}$ with a maximum attenuation of 15 dB and a gap to midgap ratio of 0.21. The circular patch had diameter, D 1.06 $\mu$m and center-to-center spacing, S=1.7 $\mu$m. The FCC structures with square patches at the lattice points had a maximum attenuation of 21 dB with center frequency of 1450 cm$^{-1}$ and a gap-to-midgap ratio of 0.83. The metal patches were 2 $\mu$m wide and the center-to-center spacing was 3.18 $\mu$m.

These structures definitely have very high operating frequencies, but their attenuation is relatively low, and all of the measured values have been compensated by subtracting the silicon transmission spectrum. For this structure to be used as a filter, the silicon substrate would always be a problem. In addition, the band gaps in the samples of McIntosh et al. are also compensated by subtracting polyimide absorption. Separating the effects of the photonic band gap structure from the material absorption is problematic, and this overlap would preclude use of the structure from most applications.

The layer-by-layer MPBG structures described earlier are related to frequency selective surfaces (FSSs). Frequency selective surfaces are two-dimensional arrays of metallic aperture elements or patches that have frequency-filtering properties. They have been studied in great detail because of their application as filters, bandpass radomes, polarizers and mirrors in microwave and far-infrared region. Different aperture and patch element geometries (e.g. square patch, circular patch, cross dipole, Jerusalem cross, square loop, circular loop, square aperture etc.) have been studied.

Most of the experimental work reported on FSS has been for single layer structures, and no results have been reported for true three-dimensional structure. Single-layer free-standing copper grid structures 12 $\mu$m thick have been reported with frequencies near the 2 THz, but the structure shows an attenuation of only 18 dB.

Metallic PBG structures on the other hand have much higher attenuation in the band gap region as compared to single layer FSSs. The metallic PBG is a three-dimensional structure which provides the unique advantage of creating a defect mode in the stop band region by disturbing the periodicity of the structure. Defect peak frequencies with very high quality factors have been reported. The layer-by-layer interconnected metallic structure discussed earlier show a quality factor, Q of 461. Quality factor is defined as the ratio of peak frequency to the 3 dB (half power) bandwidth of the peak. Also, the frequency of an MPBG defect peak is adjustable and is a function of the size of the defect introduced. Unfortunately, these devices have been difficult to construct to allow operation in the infrared region.

BRIEF SUMMARY OF THE INVENTION

It is an object of the instant invention to overcome at least some of the aforementioned and other known problems existing in the art. More particularly, it is an object of the instant invention to provide a new and improved method of manufacturing a metallic photonic band gap structure allowing operation in the infrared region. It is a further object of the instant invention to provide a new and improved method of manufacturing MPBGs having a three-dimensional photonic band gap structure. Additionally, it is an object of the instant invention to provide a method of manufacturing metallic photonic band gap structures which results in single and multi-layer flexible structures exhibiting photonic band gap in the infrared region. It is also an object of the instant invention to provide a new and improved method of manufacturing metallic photonic band gap structures having adjustable process steps resulting in varying metallic photonic band gap structures whose performance characteristics are adjusted to meet specific performance requirements. Furthermore, it is an object of the instant invention to provide a new and improved method of manufacturing metallic photonic band gap structures utilizing simple semi-conductor type manufacturing techniques.

In view of the above objects, it is a feature of the instant invention to provide a method of manufacturing metallic photonic band gap structures which utilize simple cost effective micro-fabrication based construction that uses alternating dielectric and metal layers. It is a further feature of the instant invention that the metallic photonic band gap structures resulting from the method of manufacturing of the instant invention are mechanically flexible. It is an additional feature of the instant invention that the metallic photonic band gap structures resulting from the method of manufacturing of the instant invention have characteristics of simple high pass filters, band stop filters, or filters having more complex transmission characteristics in the infrared region depending upon the periodic pattern of the metallic grids. It is a further feature of the instant invention that the method of manufacturing may be varied to adjust the critical frequencies of the filters based upon the spatial periodicity of the metal grids and the interlayer separation thereof. It is an additional feature of the instant invention that the metallic photonic band gap structures resulting from the method of manufacturing of the instant invention have a very high attenuation exceeding 35 decibels, and large fractional bandwidths. Furthermore, it is a feature of the instant invention that the metallic photonic band gap structures resulting from the method of the instant invention are lightweight, compact, and flexible. It is also a feature of the instant invention that the metallic photonic band gap structures resulting from the method of manufacturing of the instant invention do not show any visible stress on the structure of its optical characteristics upon rapid cooling in liquid nitrogen.

In accordance with a preferred embodiment of the instant invention, a method of manufacturing a flexible metallic photonic band gap structure operable in the infrared region comprises the steps of: a) spinning on a layer of dielectric to a first thickness on a GaAs substrate; b) imidizing this layer of dielectric; c) forming a metal pattern on the layer of dielectric; d) spinning on a second layer of dielectric to a second thickness on the metal pattern; e) imidizing this layer of dielectric; and f) removing the substrate from the structure. Preferably, the dielectric comprises a fluorinated polyamic acid polyimide. In a preferred embodiment of the method of the instant invention, the steps of spinning on the layers of dielectric are performed at not less than approximately 2000 RPM for approximately 45 seconds, and preferably at approximately 4000 RPM.

In this method of the instant invention, the step of imidizing comprises the steps of: g) softbaking the dielectric at approximately 120°–150° C. for approximately 30 minutes to produce partial imidization of the dielectric; and h) curing the dielectric at approximately 350°–400° C. for approximately 30–15 minutes respectively to complete imidization and consolidation of the dielectric. Preferably, the step of curing the dielectric comprises the steps of: i) placing the structure including the dielectric in an oven at a temperature of approximately 200° C.; j) ramping the temperature from approximately 200° C. to 350°–400° C.; k) soaking the dielectric at approximately 350°–400° C. for approximately 30–15 minutes; l) ramping the temperature from approximately 350°–400° C. to approximately 200° C.; and m) removing the structure with the dielectric from the oven.

The step of forming a metal pattern on the first layer of dielectric preferably comprises the steps of: n) spinning on a layer of photoresist on the layer of dielectric; o) exposing the layer of photoresist with a negative of the metal pattern with UV light; p) hardening the layer of photoresist; q) developing the pattern; r) depositing a layer of metal on the layer of photoresist; and s) removing metal from areas of the photoresist which were not patterned by the exposing step. In a preferred embodiment of the instant invention, the step of spinning on a layer of photoresist comprises the steps of: t) spinning-on the photoresist at not less than approximately 2000 RPM, and preferably at approximately 3000+/−100 RPM for approximately 45 seconds; and u) baking at approximately 900° C. for approximately 30 minutes.

In accordance with the method of the instant invention, the step of depositing a layer of metal on the layer of photoresist preferably comprises the steps of: v) e-beam evaporating aluminum; and w) depositing the aluminum at a rate not to exceed 50 angstroms per second. Preferably, the step of depositing the aluminum is performed at a rate of approximately 7–10 angstroms per second to a thickness of approximately 2000 angstroms. In a preferred embodiment, the step of removing metal from areas of the photoresist which were not patterned by the exposing step comprises the step of x) dissolving the areas of the photoresist which were not patterned by the exposing step in an ultrasonic bath of acetone. Additionally, the substrate is GaAs and the step of removing the substrate comprises the step of y) soaking the structure in a solution of citric acid and hydrogen peroxide of concentration approximately 4:1.

Preferably, the method of the instant invention is utilized to construct a multi-layer structure by, before performing the step of removing the substrate, performing the steps of: z) forming a second metal pattern on the second layer of dielectric; aa) spinning on the second metal pattern a third layer of dielectric to a third thickness; and bb) imidizing the third layer of dielectric. In a preferred embodiment, the second thickness is approximately equal to or less than approximately 11 micrometers. When, in the preferred embodiment of the instant invention, the second thickness exceeds approximately 11 micrometers, the step of spinning on the second layer of dielectric comprises the steps of: cc) spinning on a first sub-layer of dielectric of thickness not greater than approximately 11 micrometers; dd) softbaking the first sub-layer; ee) spinning on a second sub-layer of dielectric of thickness not greater than approximately 11 micrometers; ff) softbaking; and gg) repeating the spinning on, and the softbaking steps until a desired thickness is reached. The entire constructed layer is then cured.

The method of the instant invention may be repeated to produce multi-layer structures of 1, 2, 3, 4, 5, etc. metallic layers. These method steps may be performed so that the thickness of the dielectric layers separating the metallic patterns are approximately equal, or are unequal. These steps are performed to control a parameter of filter characteristic. These controlling steps include, in the step of forming a second or middle metal pattern in a three layer structure, the step of introducing a defect in the metal pattern. This defect may be adjusted to control a parameter of filter characteristic. Additionally, each step of forming a metal pattern may include the step of introducing a defect in the metal pattern, a parameter of which may be adjusted to control a parameter of filter characteristic.

A preferred embodiment of the instant invention includes a flexible metallic photonic band gap structure operable in the infrared region made by the method of the instant invention. Preferably, an embodiment of the instant invention includes a flexible filter having operating characteristics in the infrared region whose characteristics are controlled by the parameters of the photonic band gap structure resulting from the method of the instant invention.

These and other aims, objectives, and advantages of the invention will become more apparent from the following detailed description while taken into conjunction with the accompanying drawings.

BRIEF DESCRIPTION OF THE DRAWINGS

FIG. 34 is a top schematic illustration of a defect layer (called defect "s") which is introduced into the middle layer of one unit cell face-centered-cubic structure in accordance with the teachings of the instant invention, the dashed squares illustrating the areas where metal squares have been removed;

FIG. 36 is a simplified cross-sectional illustration of a unit cell of a face-centered-cubic lattice having a defect layer in the middle, and variable interlayer separation constructed in accordance with the teachings of the instant invention;

FIG. 37 illustrates Table 3 which presents different interlayer separations used for face-centered-cubic structures constructed in accordance with the teachings of the instant invention, having a defect metal patch array introduced in the middle layer and having a lateral lattice constant equal to 20 micrometers, a metallic square patch equal to 8 micrometers, and the defect layer "s" as illustrated in FIG. 34;

Figure 1:
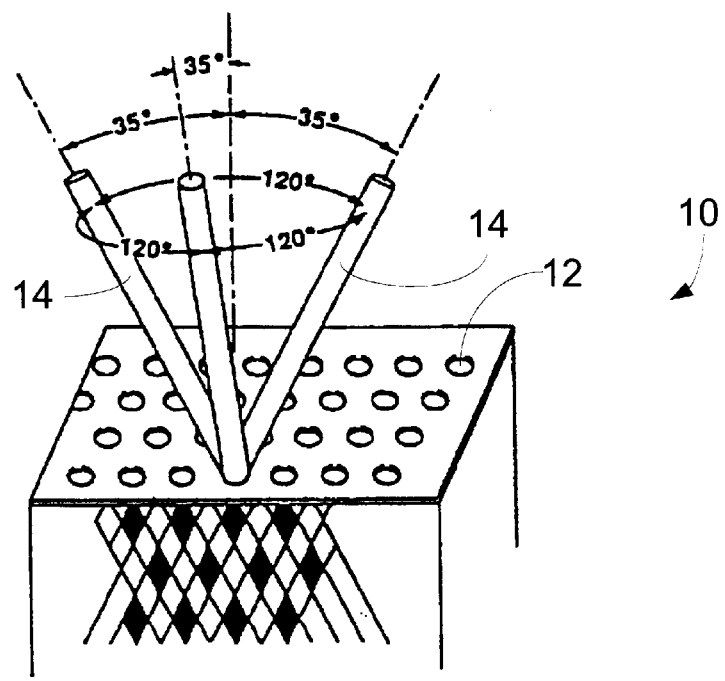
FIG. 1 is an isometric illustration of a prior art three-dimensional dielectric photonic band gap structure illustrating the hole structure at 35° to normal and 120° to each other.
Figure 2:
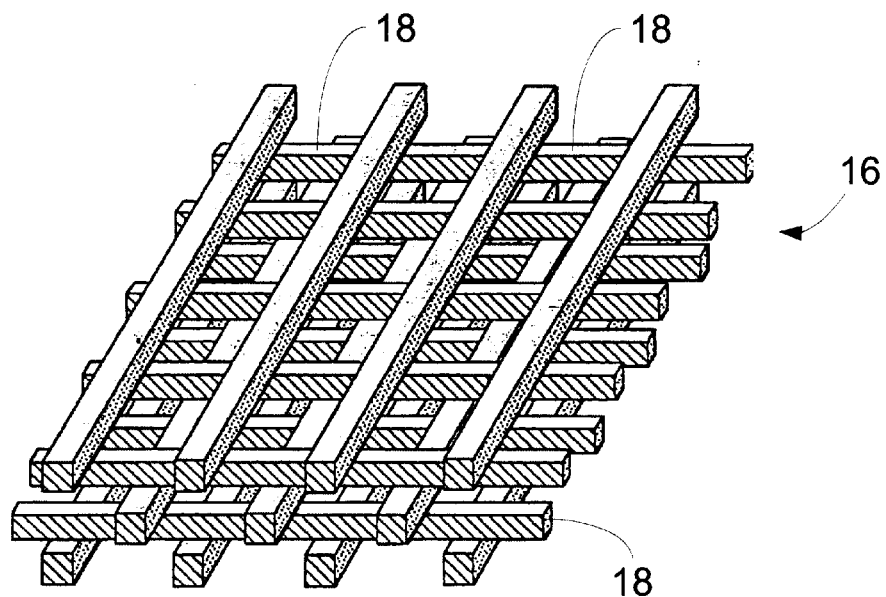
FIG. 2 is a simplified isometric illustration of a prior art layer-by-layer dielectric photonic band gap structure fabricated at Iowa State University.
Figure 3A:
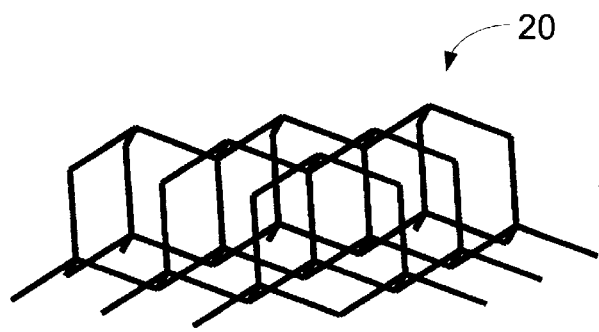
FIG. 3A is a schematic illustration of a prior art three-dimensional metallic photonic band gap structure with a diamond lattice symmetry.
Figure 3B:
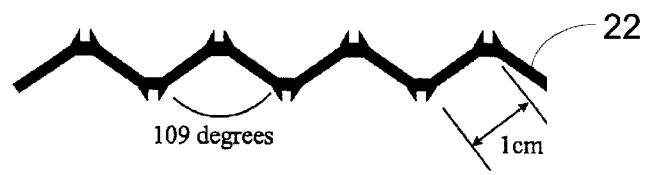
FIG. 3B is a schematic illustration of a prior art metal wire strip which is used to construct the three-dimensional metallic photonic band gap structure with a diamond lattice symmetry as illustrated in FIG. 3A.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, methods, and equivalents falling within the spirit and scope of the invention as defined by the appended claims.

DETAILED DESCRIPTION OF THE PREFERRED EMBODIMENT

This application describes successful design, fabrication and characterization of MPBG-based filter structures operating at far-infrared frequencies. The MPBGs of the instant invention have a simple, micro-fabrication-based construction that uses alternating dielectric and metal layers and results in structures that are mechanically flexible.

Depending on the periodic pattern of the metal grids as described hereinbelow, the filters have either simple high-pass, band stop or more complex transmission characteristics. The critical frequencies of the filters depend on the spatial periodicity of the metal grids and the inter-layer separation. The transmission characteristic of these filters show cut-off frequencies in the far-infrared region with very high attenuation (>35 dB) and large fractional bandwidths.

Also proven herein is the scaleable behavior of the earlier metallic layer-by-layer PBG fabricated at Iowa State in the microwave regime. The new fabrication technique of the instant invention makes the structure very lightweight, compact and flexible. The filters produced by the method of the instant invention maintain their optical characteristics after repeated bending, demonstrating mechanical robustness of the metallic PBG structure. Rapid cooling of the samples in liquid nitrogen also does not show any visible stress on the sample or its optical characteristics, making them excellent candidates for space applications.

Figure 4:
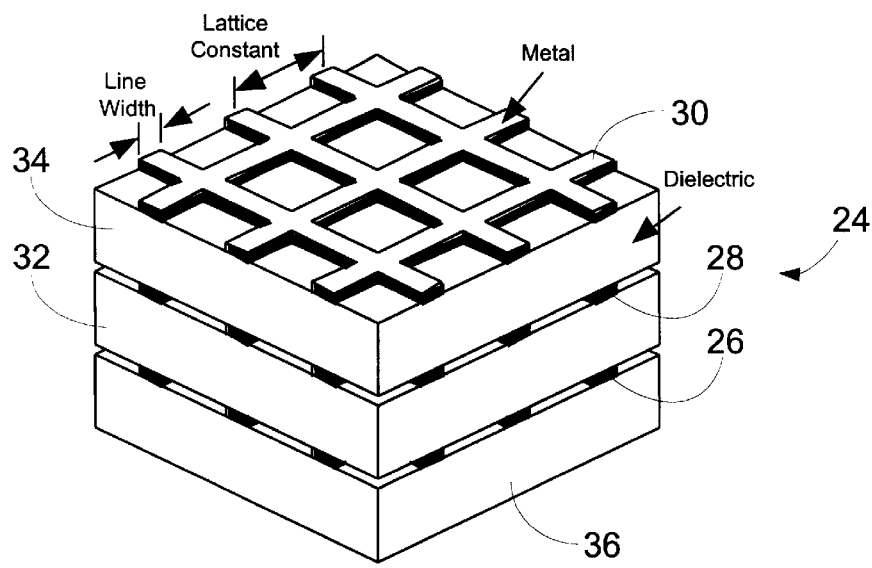
FIG. 4 is a simplified isometric view of a prior art layer-by-layer metallic photonic band gap structure fabricated on a printed circuit board using standard photolithographic techniques and capable of operation in the 75–110 GHz frequency range.

In accordance with the teachings of the instant invention, the design and fabrication of mechanically flexible MPBG structures with critical wavelengths in the far infrared are described hereinbelow. As illustrated in FIG. 4, the basic MPBG structure 24 consists of three layers of metallic mesh 26, 28, 30 aligned to each other and separated by a dielectric medium 32, 34. As discussed above, this type of MPBG structure 24 operating at millimeter-wave frequencies has been previously demonstrated. But until now, construction of MPBG structures capable of operating at micrometer frequencies has been problematic at best. The lower frequency structures 24 such as that illustrated in FIG. 4 are capable of being built using printed-circuit board technology, and have been studied for square metallic grid patterns only. The method of the instant invention uses semiconductor-type process techniques to scale the metallic PBG structure to allow operation in the infrared region. Additionally, various other lattice geometries and their characteristics are presented. The transmission spectra of the different lattice geometries is initially calculated and the critical dimensions for mask generation are derived, theoretically, before fabrication.

Prior to fabrication, the expected transmission spectrum for a particular structure of an embodiment of the instant invention is calculated using the transfer matrix method (TMM) originally introduced by Pendry and MacKinnon. In the TMM technique the total volume of the unit cell PBG is divided into small cells, and the fields associated with each cell are coupled to neighboring cells. The final transfer matrix relates the incident wave on the PBG from one side to the outgoing wave on the other side. The TMM can be used to calculate the band structure of an infinite periodic system. However, as presented herein, the TMM is used to determine the electromagnetic transmission and reflection coefficients as functions of frequency for waves incident on a PBG of finite thickness. The transfer matrix method has previously been applied in studies of defects in 2D PBG structures, of PBG materials with complex and frequency dependent dielectric constants of 3D layer-by-layer PBG structure, and of 2D metallic structure. In all those previous investigations, the theoretical results matched very well with experimental measurements.

The calculations for all the metallic structures have assumed a frequency-dependent dielectric constant for metal $$\varepsilon(\upsilon) = 1 - \frac{\upsilon_p^2}{\upsilon(\upsilon - i\gamma)}, \quad (9)$$

where $\upsilon_p$=3600 THz and $\gamma$=340 THz are the plasma frequency and the absorption value. The above equation can also be written as:

$$\epsilon(\upsilon) = \epsilon'(\upsilon) - i\epsilon''(\upsilon) \quad (11)$$

where $$\varepsilon''(\upsilon) = \frac{4\pi\sigma}{\omega} \quad (12)$$

and $$\pi = 2\pi\upsilon. \quad (13)$$

From the above equation, it can be shown that the conductivity is $$\sigma = \frac{\upsilon_p^2 \gamma}{2(\gamma^2 + \upsilon^2)}. \quad (14)$$

Similarly, the skin depth is $$\delta = c\frac{(\mu\upsilon\sigma)^{-1/2}}{2\pi}, \quad (15)$$

where c is the velocity of light and $\mu$ is the magnetic permeability. For frequencies smaller than 100 THz, $\sigma$ can be practically assumed to be independent of frequency and equal to $0.22\times10^5$ $(\Omega cm)^{-1}$. The value of conductivity is chosen to be close to the measured conductivity of Ti. For $\upsilon$=100 THz and 10 THz, the skin depth would be 0.035 $\mu$m and 0.11 $\mu$m, respectively.

Figure 7A:
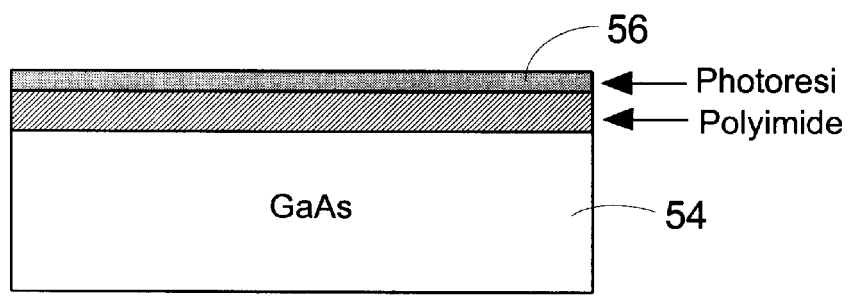
FIGS. 7A–D are simplified cross-sectional diagrams illustrating intermediate stages of the metal lift-off process utilized in accordance with the teachings of the instant invention.
Figure 7B:
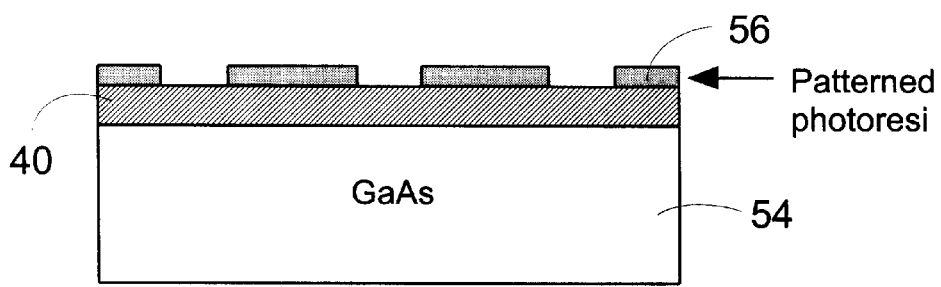
Figure 7C:
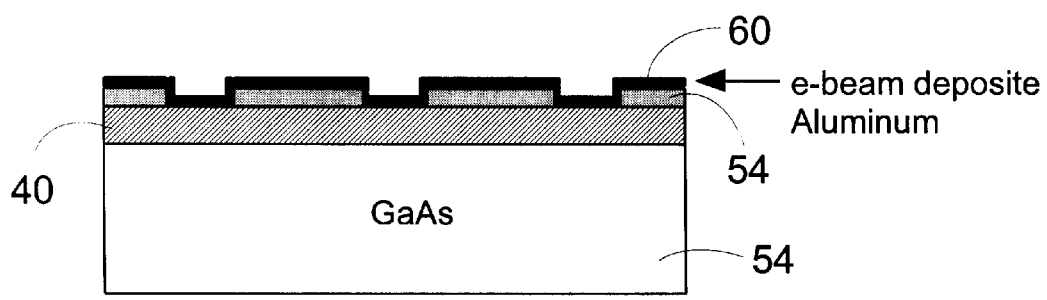
Figure 7D:
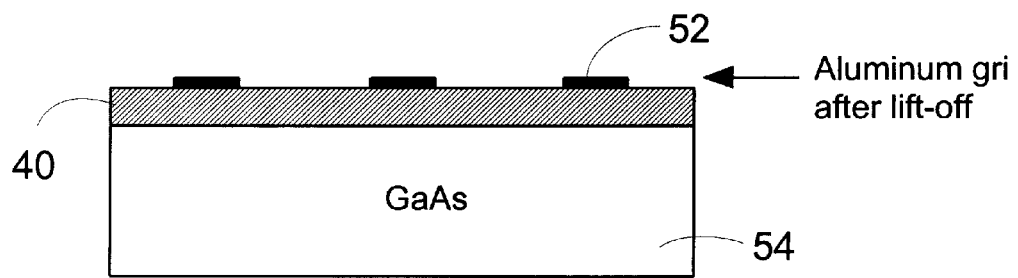
Figure 8:
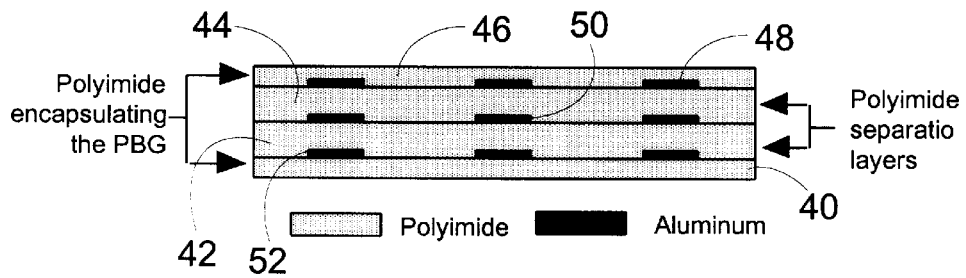
FIG. 8 is a cross-sectional illustration of a flexible metallic photonic band gap structure constructed in accordance with the teachings of the instant invention.

Looking ahead to FIG. 8, the metallic photonic band gap structures 38 of the instant invention are fabricated in a layer-by-layer fashion using alternating layers of polyimide 40, 42, 44, 46 for the dielectric and aluminum metal for the grids 48, 50, 52. The MPBG structures 38 can cover any size area, but patterns covering an area of 2×2 cm are preferred. In accordance with a preferred method of the instant invention, the layers for the structures are fabricated on a compound semiconductor substrate 54 such as GaAs (see FIGS. 7A–D). Preferably, a GaAs substrate thickness of approximately 2 inches is used for ease of manufacturing, although other thicknesses or compound semiconductor substrate materials may be used as appropriate. Other examples of compound semiconductor materials which may be used include, but are not limited to, Indium Phosphide, Indium Arsinide, or Gallium Antimonide. A standard spin-on fluorinated polyamic acid polyimide, preferably DuPont Pyralin® SP series PI-1111, having a dielectric constant $\epsilon_r$=2.8 is preferably used for the dielectric. Its chemical structure is designed to impart good mechanical and electrical properties. It has an adhesion promoter chemistry incorporated directly into the formulation, eliminating the need for a priming cycle before coating.

Figure 5:
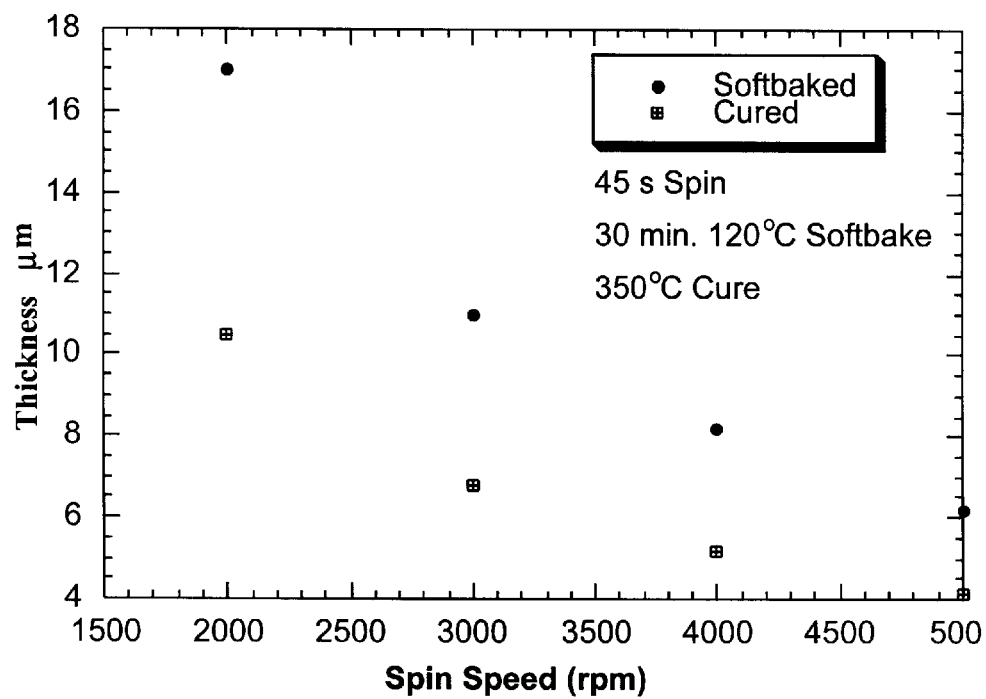
FIG. 5 is a graphical plot illustrating the relationship between polyimide thickness versus spin speed for both softbaked and cured polyimide.

The spin-on polyimide is preferably first softbaked to remove most of the solvent and produce partial imidization of the polyamic acid. Preferably, this softbake is performed between approximately 120° C.–150° C. for approximately 30 min and preferably at 130° C. After softbake, the layer is cured to complete the imidization and consolidation of the film. This completion cure is preferably performed between 350° C. and 400° C. for between 15 minutes and a half-hour depending on the selected temperature (e.g., 350° C. for 30 min.). Care is taken to introduce the sample into the furnace at a lower temperature, preferably approximately 200° C., and then the temperature is slowly ramped to the final cure temperature of preferably 350° C. to minimize substrate deformation. The sample is cured for approximately 30 mins at 350° C., and then the furnace is cooled down to approximately 200° C. before removing the sample. The relationship between polyimide thickness and spin speed for both softbaked and cured polyimide is illustrated in FIG. 5.

For embodiments of the instant invention having a desired thickness of separation layers 42, 44 (see FIG. 8) of more than approximately 11 $\mu$m, it is preferred to utilize multiple coats to make the thick layer. This method is similar to the single coat processing described above. First, polyimide is spun-on and softbaked. Then another polyimide coat is spun on the top of the first layer, followed by another softbake. Finally, the sample is cured at approximately 350° C. to complete the process. As will be recognized by one skilled in the art, the polyimide processing is preferably proceeded by a hydration bake at approximately 130° C. for about 30 minutes. As will also be recognized by one skilled in the art, the spin step described above may be preceded by a spread step at approximately 500+/−100 RPMs for about 5 seconds.

Figure 6:
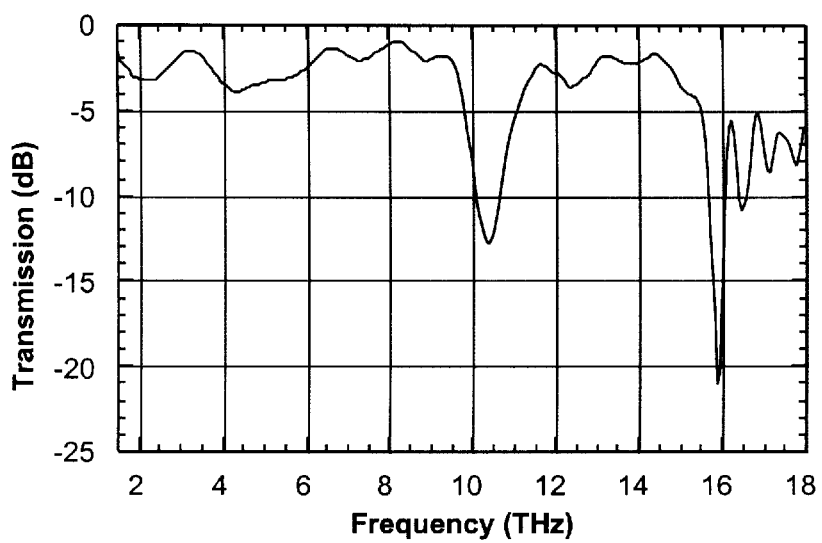
FIG. 6 is a graphic illustration of the transmission versus frequency spectrum of a 45 micrometer thick polyimide film suitable for use to construct a metallic photonic band gap structure in accordance with the teachings of the instant invention.

The transmission characteristics of cured PI-1111 is good in the 2 to 8 THz frequency region as shown in FIG. 6 for a 45 $\mu$m thick layer. There are two strong absorption bands centered around 10 and 16 THz, and these frequency bands are preferably avoided in building the MPBG structure of the instant invention. The dimensions of a preferred MPBG structure are chosen so that the critical frequencies are safely below the absorption bands.

The aluminum metal grid pattern is formed on the polyimide in a preferred embodiment of the instant invention using a standard lift-off technique. A cross-section of a sample illustrating the intermediate steps of this lift-off process is illustrated in FIGS. 7A–D. First, photoresist 56, such as, e.g., AZ-5209E, is spun onto the surface of polyimide 40 at approximately 3000+/−100 RPM and is baked at approximately 90° C. for about 30 minutes. It is exposed to UV light with the negative of the grid pattern mask (see, e.g., FIG. 10, mask 58). The exposed photoresist is hardened in a chlorobenzene soak for approximately 10 minutes, after which the pattern is developed (FIG. 7B). Then, an aluminum layer 60 is deposited on the sample surface using e-beam evaporation (FIG. 7C). Preferably, the aluminum layer 60 is deposited 2000 Å thick. The deposition rate for aluminum is best maintained within 5 to 10 Å/sec and preferably between 7 to 10 Å/sec. Preferably, the deposition rate will not exceed 50 Å/sec. The thickness of the photoresist 56 is about 1 $\mu$m which is sufficient for the lift off of 2000 Å metal. The sample is now treated with acetone in an ultrasonic bath to remove unwanted aluminum by dissolving the photoresist 56 underneath, leaving only the metal grid 52 on the polyimide 40.

The polyimide and metal deposition is repeated to make the 3-layer MPBG structure 38 as illustrated, e.g., in FIG. 8. After completing the three metal layers 48, 50, 52, another thin, preferably 5 $\mu$m, coating of polyimide 46 is spun on and cured as described above. The sample is now treated in a solution of citric acid and hydrogen peroxide (4:1) to etch away the GaAs substrate 54 (see FIGS. 7A–D), a process that typically requires approximately 30 hrs. At the end of the GaAs etching step, a flexible sheet of polyimide is left with the metallic PBG embedded in it as shown in FIG. 8. The complete MPBG structure 38 is encapsulated by a coating of polyimide on the top 46 and bottom 40. Preferably, this coating is approximately 5 $\mu$m thick.

Several sets of samples with different lattice geometries were fabricated by the method of the instant invention to systematically study the transmission and reflection characteristics. All the samples have total polyimide thickness of 9 $\mu$m to 60 $\mu$m depending on the particular structure, although other thickness may be used depending on system requirements.

The transmission characteristics of the MPBG structures were measured using a Fourier transform infrared (FTIR) spectrometer (Nicolet model Magna IR 760), which can measure over a range of 1.5 THz to 330 THz. The minimum relative response of the system is 35 dB. The basics of an FTIR are explained with reference to FIG. 9.

Figure 9:
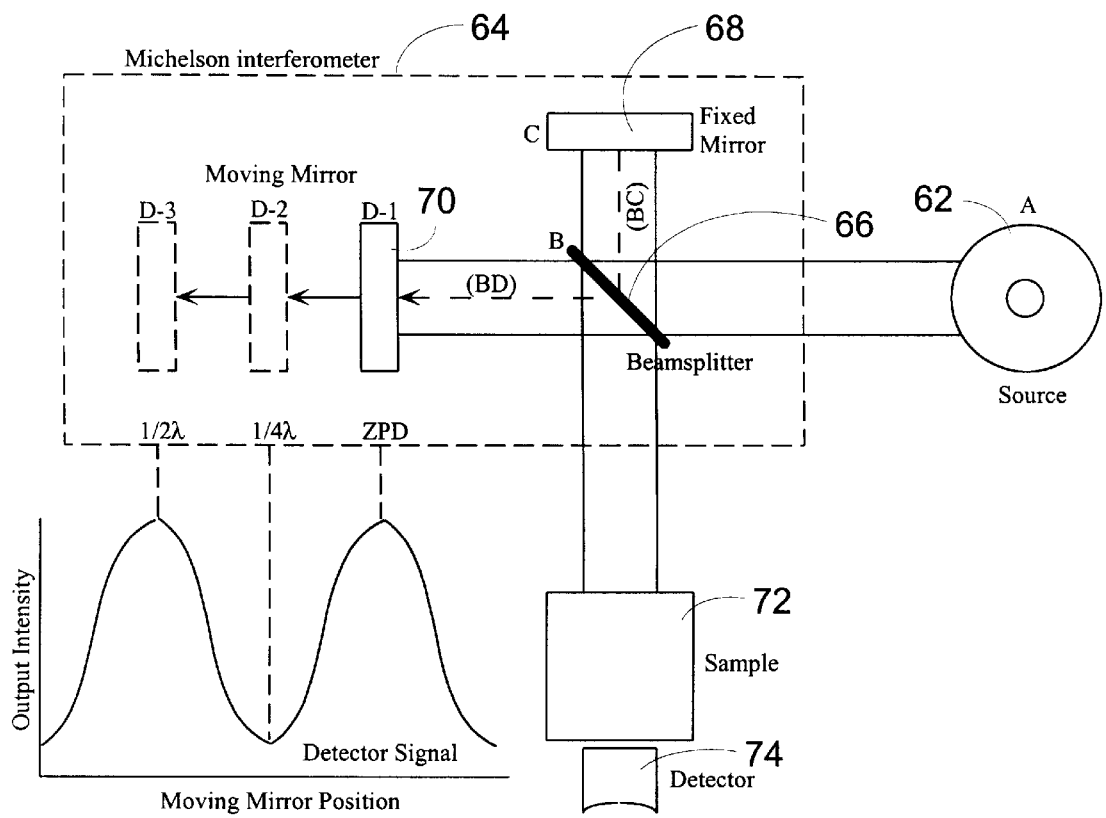
FIG. 9 is a schematic illustration of an FTIR spectrometer setup used in testing the flexible metallic photonic band gap structures constructed in accordance with the teachings of the instant invention.

FIG. 9 shows the basic FTIR setup in which the infrared light from the source "A" 62 is incident on the Michelson interferometer 64, the main component of FTIR spectrometry. The interferometer 64 modulates each wavelength of light at a different frequency.

The light beam from the source strikes the beamsplitter (B) 66, of which about half is reflected from 66 and is directed to the fixed mirror C 68. The remaining light is transmitted through the beamsplitter 66 and is directed onto the moving mirror, D 70. When the two beams recombine, constructive or destructive interference occurs depending on the position of the moving mirror 70 relative to the fixed mirror 68.

The modulated beam is reflected from mirror to the sample 72, where selective absorption takes place. The beam travels from the sample 72 on to the detector 74 which translates it to an electrical signal.

The cosine waves produced by the source 62 and modulated by the interferometer 64 appear to the detector 74 as an interferogram. This is a signature of intensity versus mirror position. The interferogram is a summation of all the IR frequencies and cannot be interpreted in its original form for all practical purposes. The signal from the detector 74 is fourier transformed by the computer (not shown) and converted into an IR spectrum. Fourier Transform calculates the amplitude of each of the component signals which gives the intensity at the corresponding wavelength of light.

All the measurements were done using an unpolarized beam. Most of the transmission measurements were done with incoming beam at normal incidence. All the reflection measurements were at an 110° angle of incidence. Transmitted and reflected power measurements are presented on a logarithmic scale. For all the measurements, the spectral resolution was 0.06 THz. In the typical measurement, the results were obtained by averaging over 200 scans. The sample chamber of FTIR is nitrogen purged during measurements. Nitrogen purging helps to remove water vapor and carbon dioxide, which introduce absorption bands in the measured spectrum. The noise level in an FTIR falls as the square root of the number of scans. Measurements averaged over 200 scans therefore reduce noise level significantly. The transmission and reflection spectra of the structures are discussed hereinbelow.

Figures 10, 11:
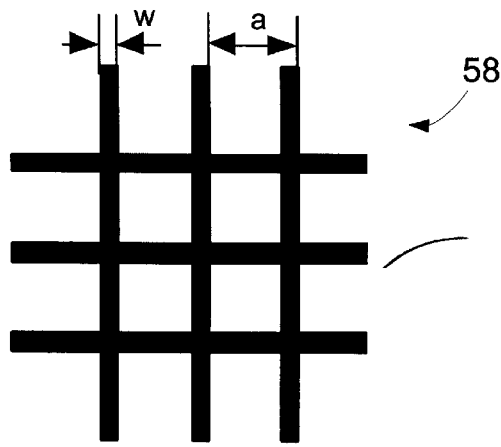
FIG. 10 is a schematic illustration of a metallic pattern mask set having a square grid configuration with lattice constant a in line with w.
FIG. 11 illustrates Table 1 containing sample sets for square metal grids with different lattice constants and line widths which set forth the parameters of exemplary embodiments described herein.

The first family of metallic PBG structures manufactured in accordance with the teachings of the instant invention had high-pass transmission characteristics. The structures had three layers of square metal grids aligned to each other. This structure is similar to the grid geometry used by McCalment et al. at lower frequencies. The top view of the metal grid structure 58 is shown in FIG. 10. Mask sets with different lattice constants and line widths were also designed and fabricated in accordance with the teachings of the instant invention. The different mask set details are listed in Table 1 illustrated in FIG.

Several samples were fabricated by the above method using these three mask sets. The transmission and reflection characteristics of these structures were measured and compared with the theoretical calculations. The characteristics of these MPBG structures were also studied as a function of lattice constant, number of metal layers and thickness of dielectric medium separating the adjacent layers.

Figure 12A:
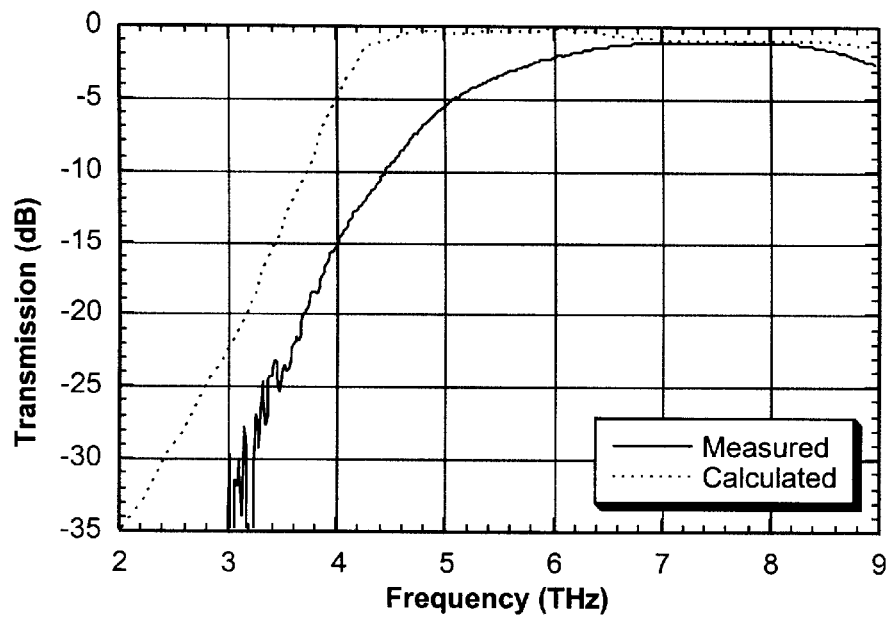
FIGS. 12A–B are graphical illustrations of the transmission and reflection measurements and calculations of an exemplary embodiment manufactured in accordance with the teachings of the instant invention.

The measured and calculated transmission characteristics of a three-metal-layer structure fabricated using mask set B with lattice constant of 16 $\mu$m and inter-layer separation of 11 $\mu$m are shown in FIG. 12A. The structure shows the expected high-pass behavior with a cutoff at about 6.5 THz. The measured transmission curve shows an attenuation of more than 35 dB in the stopband region, while in the transmitting region the attenuation is about 2 dB. The measurements agree well with predicted results, although the measured transmission in the pass-band is somewhat lower than expected.

All the results have a mismatch of about 18% between measured and calculated spectrum for all the interconnected structures discussed here. This is probably due to the poor convergence of the TMM calculations. Each unit cell has been divided into N×N×N cells, where N=20. The unit grid size for calculation within the unit cells would be 0.8×0.8× 0.8 $\mu$m. Using this grid dimension, as listed in Table 2 illustrated in FIG. 13, the structure defined in the calculations has dimensions that are different for the measured structure. A higher value of N would be needed for better convergence.

From Table 2, it may be observed that the line-width in the calculation is 0.7 $\mu$m more than the fabricated structure, the inter-layer separation is off by 0.2 $\mu$m and the thickness of the metal is 0.8 $\mu$m as compared to 0.2 $\mu$m in the fabricated structure. These mismatches in the calculated and measured geometry would significantly affect the characteristics of the structure.

Another major cause of mismatch would be the absorption due to polyimide. In the calculations the dielectric is assumed to have no absorption. This results in very high quality factors and excellent transmission and reflection characteristics for theoretical, but which are not seen in the measurements.

Figure 12B:
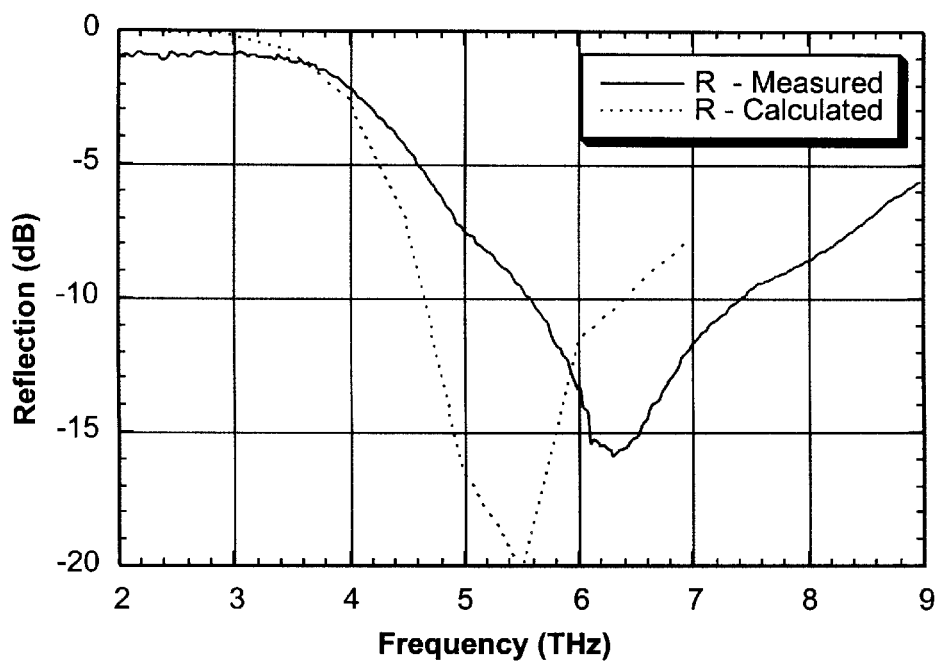

FIG. 12B also shows the reflection characteristic of the MPBG structure at 110° angle-of-incidence. As expected, the reflection in the stopband region is very high with an attenuation of less than 1 dB in the stopband region. The reflection drops down to 16 dB outside the gap near 6.5 THz region. The presence of a higher-order band gap is very prominent in the reflection spectrum where an increasing trend in the reflection characteristic above 6.5 THz can be noticed.

Figures 13, 14:
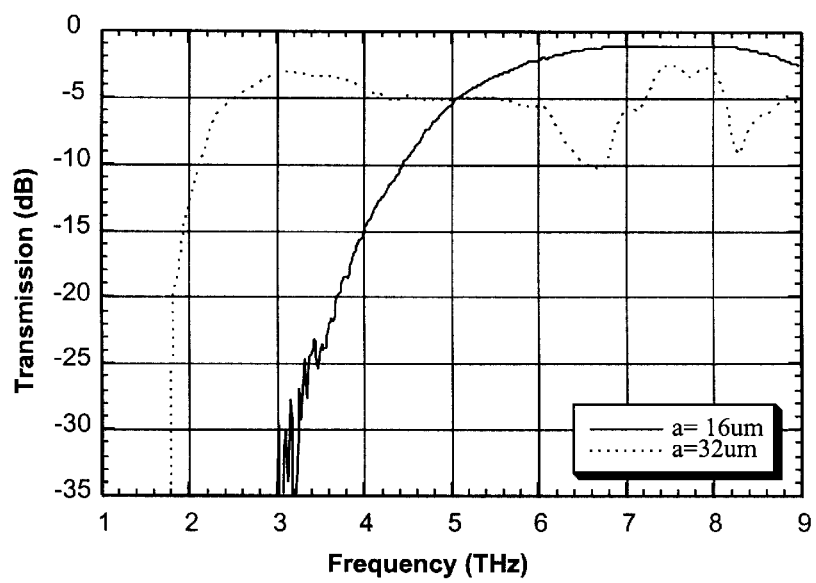
FIG. 13 illustrates Table 2 which presents the differences between the fabricated structure of an embodiment of the instant invention and the parameters which were used in the calculations to determine the transmission and reflection measurements illustrated in FIGS. 12A–B.
FIG. 14 is a graphical illustration presenting a comparison between the transmission measurements of sample set a and b as listed in Table 1 having interlayer separations of 17 micrometers for sample a and 11 micrometers for sample b.

The next set of measurements shows the relationship between cutoff frequency of the high-pass structure and the lattice constant of the square metallic grid. The two measured transmission spectra of FIG. 14 show two three-layer structures fabricated in accordance with the teachings of the instant invention using mask sets A (a=32 $\mu$m) and B (a=16 $\mu$m) with polyimide spacers of 17 $\mu$m and 11 $\mu$m respectively. FIG. 14 shows that reducing the lattice constant of the metal grid increases the cutoff frequency of the high-pass filter. The 32 $\mu$m structure with 5 $\mu$m line width shows a cutoff at about 3.0 THz while the 16 $\mu$m structure with 2.5 $\mu$m line width shows a higher cutoff frequency near 6.5 THz. The attenuation in the transmitting region of the MPBG with 32 $\mu$m lattice constant is about 4 dB as compared to only 2 dB in the 16 $\mu$m structure. This is a direct result of the fact that total polyimide thickness in the 32 $\mu$m MPBG is about 44 $\mu$m and has more absorption as compared to thinner 32 $\mu$m polyimide in the 16 $\mu$m MPBG structure.

Figure 15:
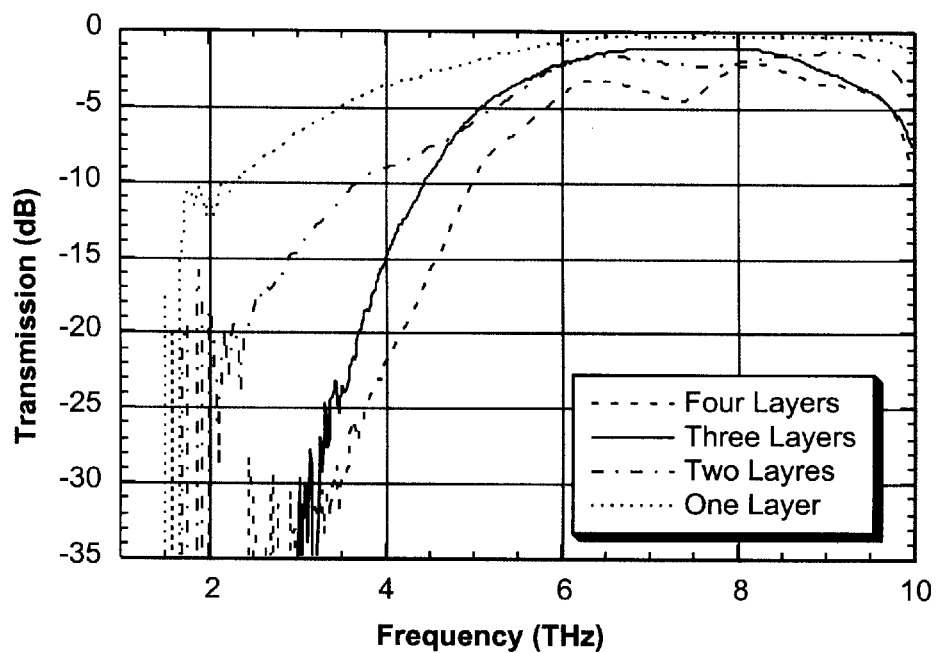
FIG. 15 is a graphical illustration presenting the attenuation in the band gap region as a function of the number of layers of the metallic photonic band gap structure constructed in accordance with the teachings of the instant invention having a lattice constant, a=16 micrometers, line width, w=2.5 micrometers, and interlayer separation equal to 11 micrometers.

The effect of the number of layers in the MPBG structure is shown in FIG. 15, which shows transmission spectra for 1, 2, 3 and 4 layer MPBGS. Note that the 1-layer MPBG structure is similar to an FSS discussed above. The grid with lattice constant of 16 $\mu$m is used for these samples. The attenuation in the stopband region of the three-layer MPBG with 35 dB is significantly better than the FSS which has only a 12 dB attenuation. The MPBG structure also has a much higher rate of attenuation (i.e. slope of transmission edge) from pass-band to the stopband region at 15 dB/THz as compared to 2.2 dB/THz for the single layer FSS. It can also be concluded from FIG. 15 that the attenuation per layer is about 12 dB. The four-layer structure should have a higher drop in the band-gap region, but due to the limitations of the measuring instrument, its true value cannot be measured. The drop in transmission in the pass-band region of the four layer structure shows a significant attenuation of about 4 dB, which may be due to absorption in the polyimide. The interference fringes created because of polyimide thickness may also be observed.

Figure 16:
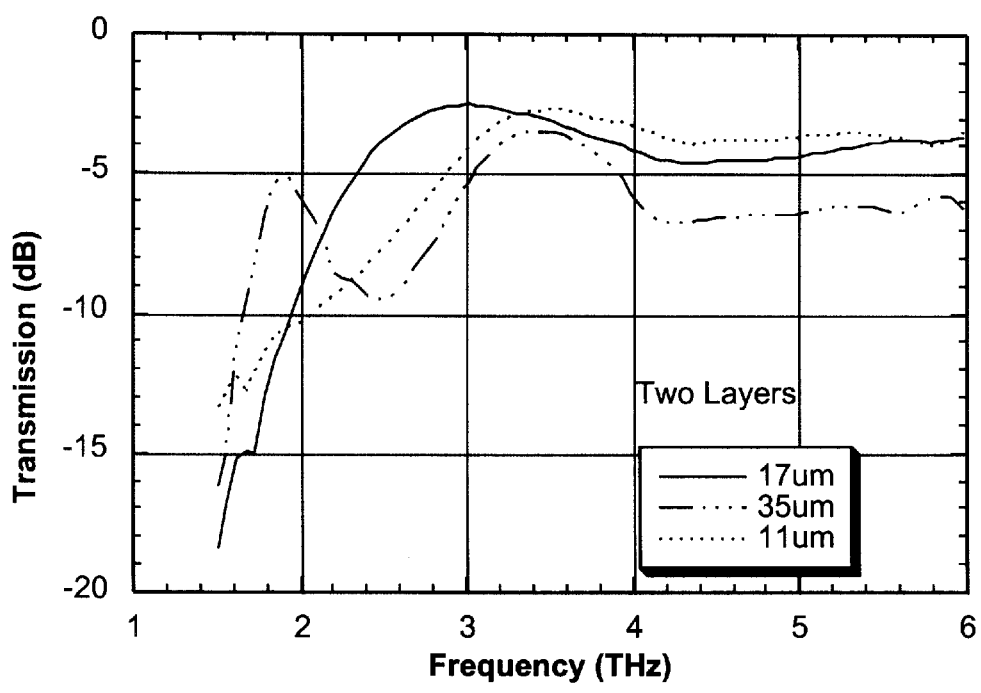
FIG. 16 is a graphic illustration representing the change in cutoff frequency as a function of interlayer separation, the variation being in accordance with the teachings of the instant invention.

The cutoff frequencies of the structures are also found to be somewhat dependent on the polyimide spacer thickness. The dependence is not strong, but the effect can be used for fine adjustment of the cut-off frequency. This feature is particularly useful when the mask set is already designed for the filter to operate at a certain frequency and minor frequency adjustments are required. FIG. 16 shows the measured values for two-layer metallic structures fabricated using mask set A with lattice constant a =32 $\mu$m. A 35 $\mu$m polyimide spacer results in a cutoff frequency of 1.9 THz. Reducing the interlayer separation to 17 $\mu$m increases the cutoff to a value of 3 THz for the same grid size. Further reducing the polyimide spacer to 11 $\mu$m moves the cutoff to 3.4 THz. However, it is clear from the measurements that, as the interlayer separation is reduced, the attenuation in the band gap also reduces. For a separation of only 11 $\mu$m, the two-layer structure almost behaves like a single layer FSS with attenuation of only 12 dB in the band gap region. Another feature to be noticed in the 35 $\mu$m sample is the presence of a higher order band gap centered near 2.5 THz which is not visible in the samples with smaller separations. This effect can be seen in FIG. 16 for the spectrum having 35 $\mu$m inter-layer separation.

The filter characteristic changes very little as the incidence angle is varied from 90° to 40°. The cut-off frequency is nearly independent of incidence angle in that range, and the transmission in the band gap region changes from 35 dB at normal incidence to 30 dB at 40°.

Figure 17:
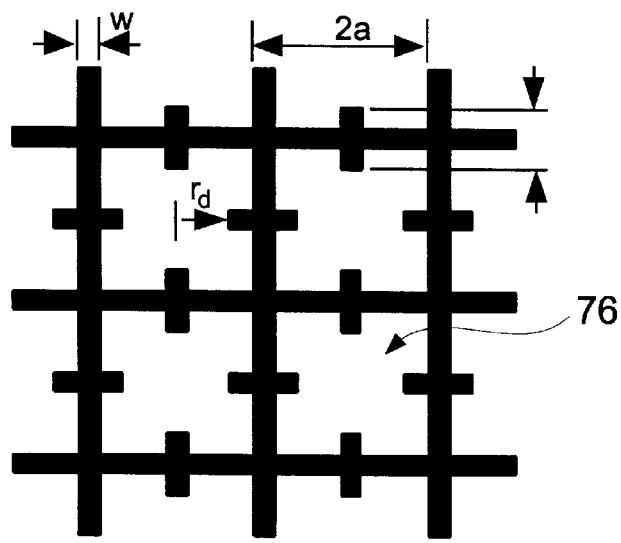
FIG. 17 is a schematic illustration of a metallic pattern mask having a defect introduced therein, where L is the length of the cross-arm, and rd is the radius of metal removed from every other intersection of the mask.

The effects of introducing a defect in the structure by disturbing its periodicity during the manufacturing process of the instant invention is now discussed. The defect is introduced in the middle layer 50 of the three-layer MPBG structure 38 illustrated in FIG. 8. The defect layer has a portion of the metal grid removed from every other intersection 76, as shown in FIG. 17.

The defect structures were fabricated for mask set B which has a lattice constant a=16 $\mu$m and line width w=2.5 $\mu$m. The radius of metal removed from every other cross section, rd had values of 4.75 $\mu$m, 6.75 $\mu$m and 10.75 $\mu$m. The inter-layer separation between the adjacent metal grids was maintained at 11 $\mu$m. As usual, these samples had a top and bottom 5 $\mu$m polyimide layer encapsulating the structure.

Figure 18:
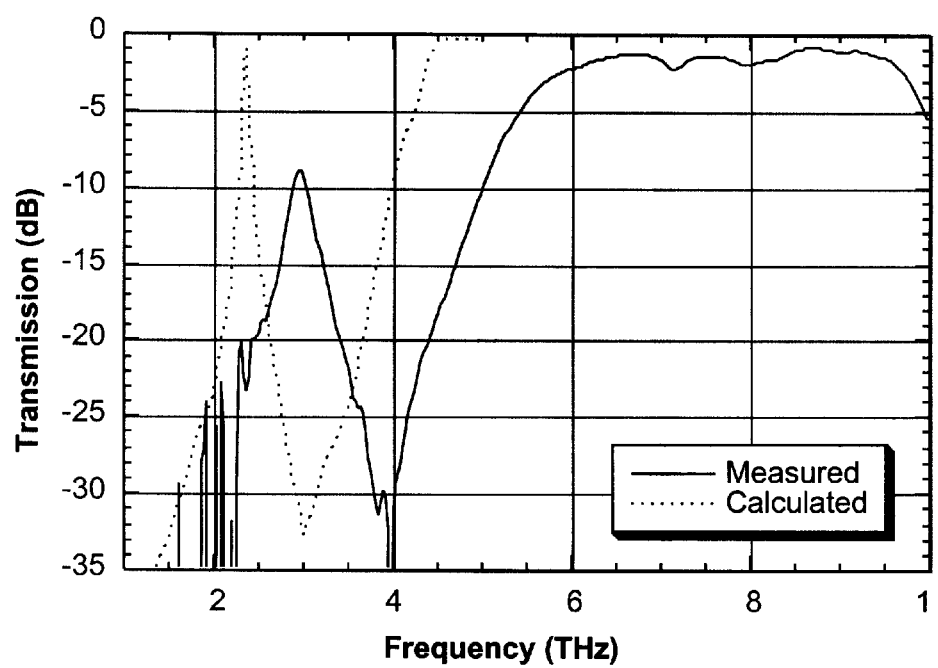
FIG. 18 is a graphical illustration showing the measured and calculated defect peaks in the band gap region of a structure constructed in accordance with the teachings of the instant invention and having a defect radius, $r_d$=4.75 micrometers with a lattice constant, a=32 micrometers, and a line width w=2.5 micrometers (3.2 micrometers in calculation), and interlayer separation=11 micrometers (11.2 micrometers in calculation)

The transmission and reflection measurements are performed on different sets of defect structures. FIG. 18 confirms the presence of a defect mode created by disturbing the periodicity of the structure. The simulated transmission response is in fairly good agreement with the measured data. The defect radius introduced in the measured structure was 4.75 $\mu$m, which introduces a defect peak near 3 THz. The peak transmission is about 8.5 dB at the peak and has a quality factor Q of 10. The quality factor, Q is defined as $$Q = \frac{f_p}{BW} \qquad (16)$$

where $f_p$ is the frequency at which the intensity is maximum and bandwidth, BW is the frequency range around $f_p$ outside which the intensity falls to 3 dB below the peak intensity. The calculated defect frequencies have much higher peak intensity and quality factor as compared to the measurements. This may be due to the fact absorption in the polyimide is not accounted for in the theoretical calculations and the line width used for calculation purpose is 3.2 $\mu$m as compared to 2.5 $\mu$m in the actual structure.

Figure 19:
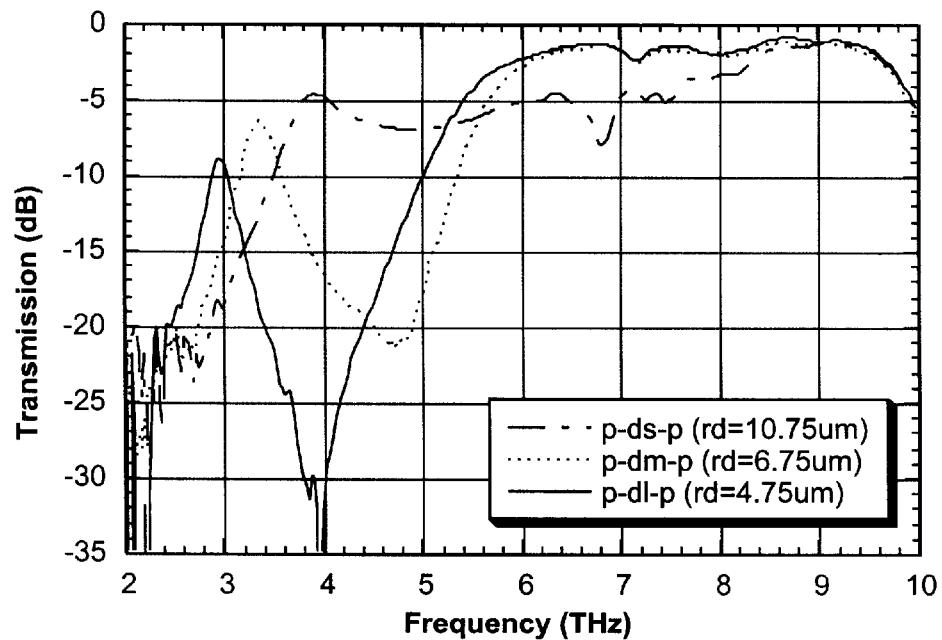
FIG. 19 is a graphical illustration presenting the defect peak as a function of the defect radius, $r_d$, showing increasing defect radius as increasing the defect frequency, and having a lattice constant equal to 16 micrometers, in line width equal to 2.5 micrometers and an interlayer separation equal to 11 micrometers.

The transmission characteristics of the MPBG structure with defects have also been studied as a function of change in defect radius. FIG. 19 shows the transmission characteristic of the structures with different defect radii. It can be seen that as $r_d$ increases from 4.75 $\mu$m to 10.75 $\mu$m, the defect peak frequency increases from 3 THz to 4 THz and moves nearer the band edge. This is in good agreement with theoretical calculations which show a similar trend. These measurements also show that as the defect radius increases, the peak intensity of the defect modes moves to higher frequencies but the quality factor of the peak reduces. For $r_d$=10.75 $\mu$m, the attenuation at the defect peak is only 4.5 dB but the peak broadens and the Q value is very low. Again, the absorption due to polyimide reduces the intensity of defect peaks.

Figure 20:
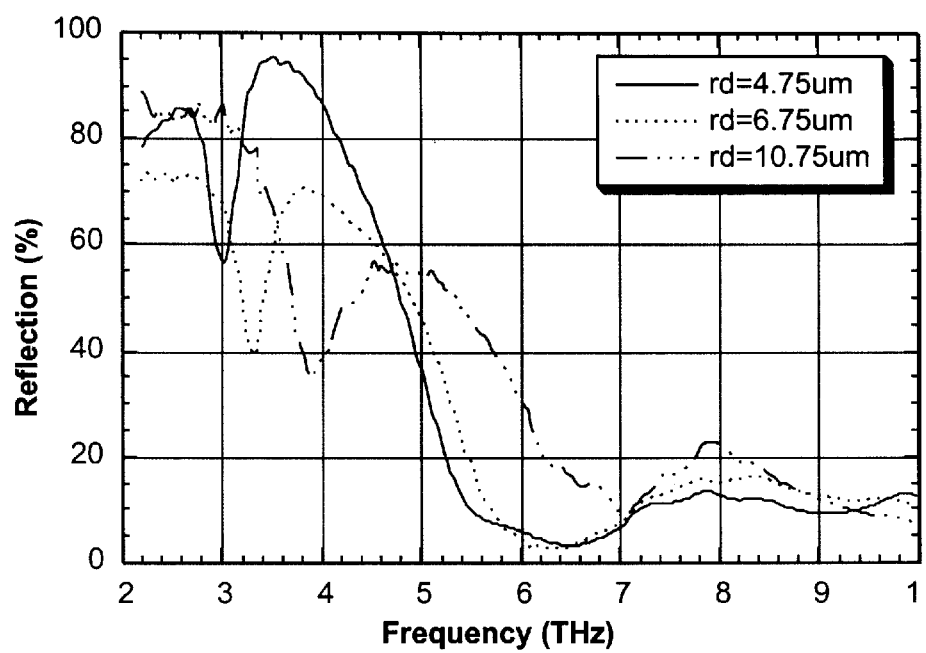
FIG. 20 is a graphical illustration of reflection measurements on samples constructed in accordance with the teachings of the instant invention having different defect radii with a lattice constant of 16 micrometers, a line width of 2.5 micrometers and interlayer separation of 11 micrometers.

The reflection measurements of the defect peaks are shown in FIG. 20. All the reflection measurements were taken at an 11° angle-of-incidence as previously indicated.

The respective defect peaks in the transmission spectrum show a dip in reflection at respective frequencies. But in these cases also, the reflection dip as well as the Q values are very low which may be due to polyimide absorption. For the structure with $r_d$4.75 μm, the reflection in the band gap region is 95% and near the defect peak frequency of 3 THz, the reflection dips down to only about 60% which is even less than 1 dB.

Figure 21:
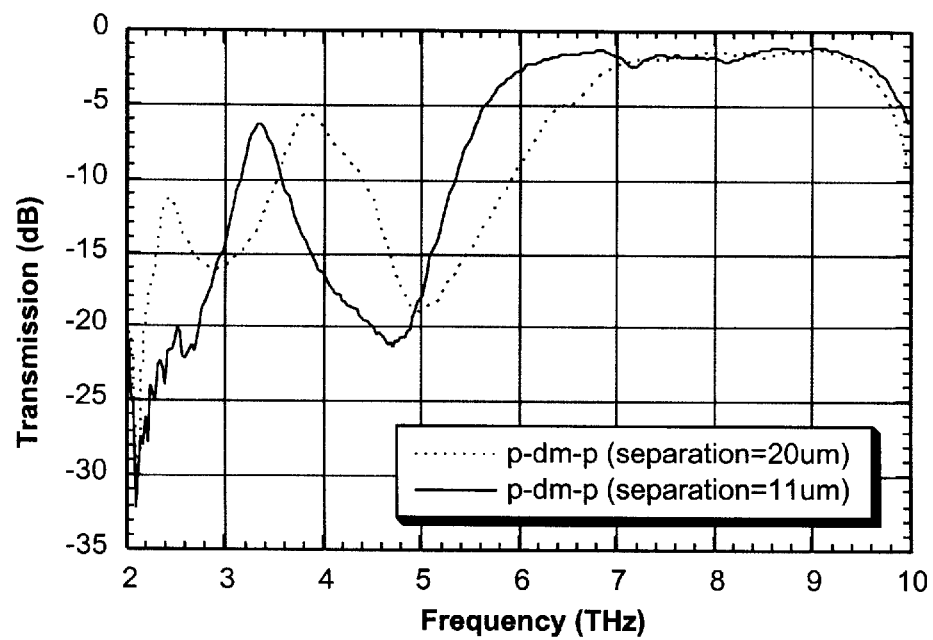
FIG. 21 is a graphical illustration of the change in defect peak as a function of interlayer separation, the variation being constructed in accordance with the teachings of the instant invention, of a sample having a defect radius equal to 6.75 micrometers, a lattice constant of 16 micrometers, and a line width of 2.5 micrometers.

The transmission characteristics of the defect structures were also studied as a function of inter-layer separation as illustrated in FIG. 21. For the same defect radii, a new set of structures was fabricated by the method of the instant invention with inter-layer separation of 20 μm as compared to the earlier value of 11 μm. The first thing to notice is that the band-edge shifts down in frequency and the higher-order band gap becomes very prominent, as was observed in the earlier periodic square grid results of FIG. 16. In the results previously shown for a structure with lattice constant of 32 μm with inter-layer separation 35 μm, the higher-order band gap is very prominent. It is clear from the measurements that the edge of the band gap and the defect peak frequency are reduced by increasing the inter-layer separation as shown in FIG. 21. The band-edge shifts from 6.5 THz to near 4 THz as can be seen from the transmission spectrum. For the 6.75 μm defect radius with lattice constant of 16 μm, the defect peak moves down to 2.5 THz from 3.4 THz as the separation between the layers increases from 11 μm to 20 μm. Reflection measurements show similar behavior as reported in the previous results. The strength of the defect peak is much lower in the reflection measurements.

Figure 22:
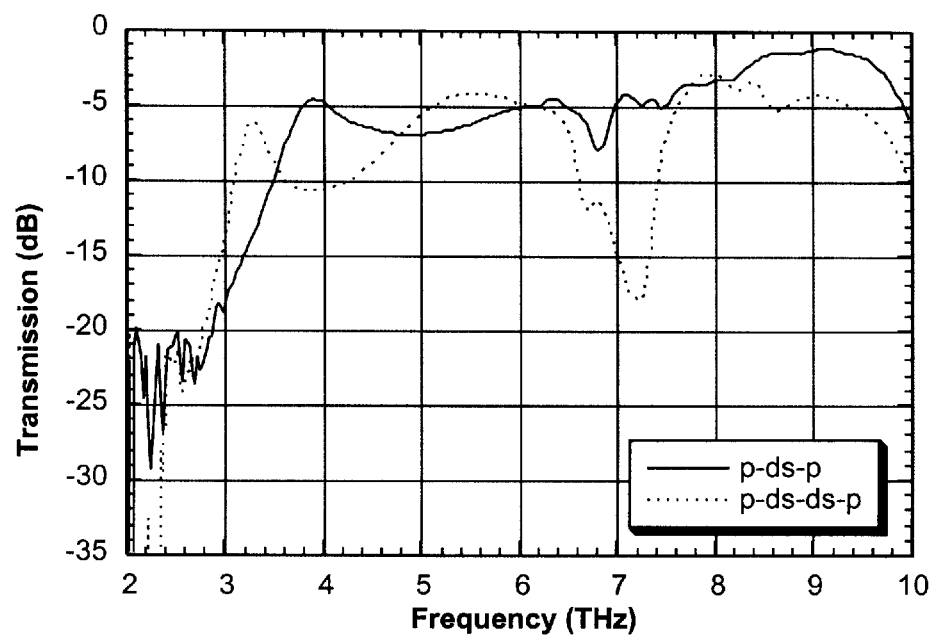
FIG. 22 is a graphical illustration showing the change in defect peak as a function of the number of defect layers of a structure constructed in accordance with the teachings of the instant invention, the structure having a defect radius equal to 10.75 micrometers, a lattice constant equal to 16 micrometers, a line width equal to 2.5 micrometers, and an interlayer separation equal to 11 micrometers.

The next set of measurements illustrated in FIG. 22 shows the effect of increasing the number of defect layers on the transmission characteristic of the MPBG structure. A sample was fabricated in accordance with the method of the instant invention with two defect layers between the top and bottom layers of periodic square metallic grids. The structure is fabricated for $r_d$=10.75 μm. The transmission measurements of FIG. 22 show that by adding one more defect layer, the defect peak moves to a lower frequency of 2.2 THz from 2.9 THz. The defect peak has a higher attenuation, but its Q value has improved. The band edge of the structure also moved to a lower frequency of about 5.5 THz. The higher order band gap near 7 THz shows a much higher attenuation of about 17 dB in the band gap region. It can be concluded that increasing the number of defect layers improves the quality factor of the defect peak and moves it to a lower frequency. The higher order band gap near 7 THz is a feature due to the defect layer. This will be clearer below when band-reject filters are discussed in detail.

Figure 23:
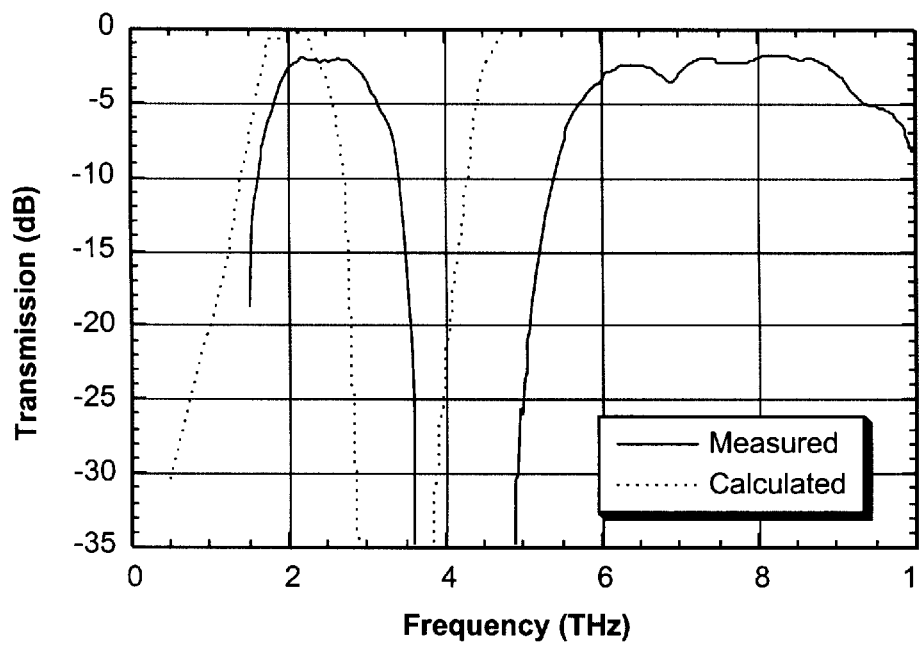
FIG. 23 is a graphical illustration showing the measured and calculated transmission spectrum for a band reject filer constructed in accordance with the teachings of the instant invention having cross-arm length, L=22.5 micrometers, and a lattice constant equal to 16 micrometers, a line width equal to 2.5 micrometers (3.2 micrometers in calculations), and interlayer separation equal to 11 micrometers (11.2 micrometers in calculations.

Filter characteristics when the defect layer pattern is used for all the three layers of MPBG structure are now discussed. It may also be described as a periodic square metallic grid which has a metal bar of length L (see FIG. 17) introduced normal to each arm of the square. Here, L is defined as L=2(a−$r_d$). This structure has a lattice periodicity of 32 μm and line width of 2.5 μm. The measurements show that by changing the pattern of the metal grid to include a periodic defect in all the layers, a rejection band can be introduced into the pass band of the original structure. The metal grid pattern used to effect this change is the same as shown in FIG. 17. Using the modified grid pattern, a three-layer MPBG structure with 11 μm inter-layer separation is fabricated in accordance with the teachings of the instant invention. The measured and calculated transmission characteristic of the structure with cross-arm length, L=22.5 μm are shown in FIG. 23.

Figure 24:
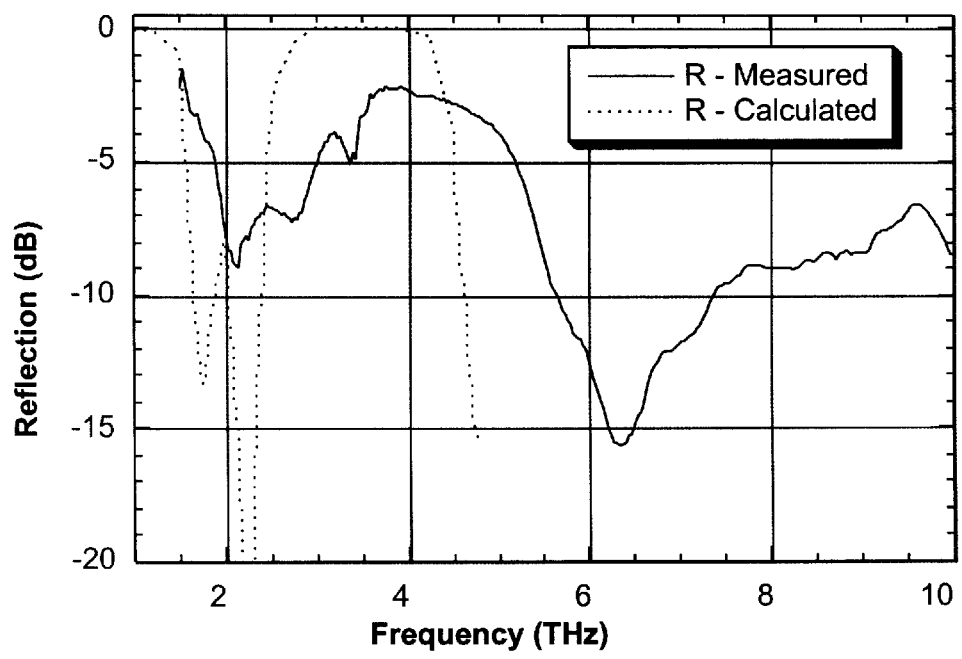
FIG. 24 is a graphical illustration showing the reflection spectrum of a band reject filter constructed in accordance with the teachings of the instant invention, the sample having a cross-arm length equal to 22.5 micrometers, a lattice constant equal to 16 micrometers, a line width equal to 2.5 micrometers (3.2 micrometers in calculations), and interlayer separation of 11 micrometers (11.2 micrometers in calculations)

The measurement results show a similar low frequency cut-off near 2.5 THz as shown in the earlier square grid structure with 32 μm lattice constant (see FIG. 14). In addition to this low cutoff frequency, there is a higher-order rejection band centered around 4 THz. The higher edge of this band gap is near the cut-off frequency of the 16 μm square grid structure i.e. 6.5 THz. The band is deep, with rejection of more than 35 dB, and fairly wide, with a fractional band width of about 46%. The discrepancy between the measured and the calculated spectrum is approximately 18%. Again, this is due to the differences in the measured and calculated grid dimensions and absorption due to polyimide which are not included in simulations. The reflection spectrum of the structure in FIG. 24 shows an attenuation of about 2 dB in the higher order band gap.

For the MPBG structure, the center of the second band occurs at $\mu$=2 nL, where n is the dielectric constant of the polyimide and L is the length of the cross arm. This relationship was confirmed in another MPBG structure—lattice constant of 22 μm, line width of 1.5 μm, and cross arm length of 12.5 μm—which had the second band gap centered at 6.9 THz.

Figure 25:
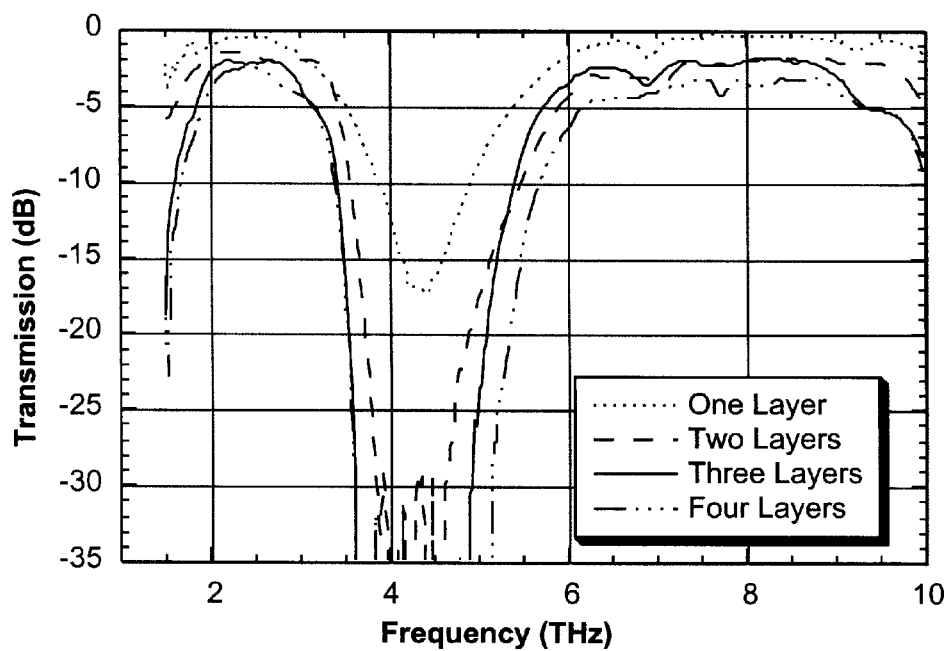
FIG. 25 is a graphical illustration showing the transmission spectrum as a function of the number of metal layers of a structure constructed in accordance with the teachings of the instant invention, the structures having a cross-arm length equal to 22.5 micrometers, a lattice constant equal to 16 micrometers, a line width equal to 2.5 micrometers and interlayer separation of 11 micrometers.

The attenuation per layer of this modified structure has also been studied. Different samples were fabricated in accordance with the instant invention with increasing number of metal layers. As can be seen in FIG. 25, a single layer FSS using the same pattern had a similar stopband, but the maximum rejection is only 15 dB at the center of the band. As the number of layers is increased, the attenuation in the stopband region improved. The attenuation per layer is about 15 dB. The band-edges are fairly sharp for the three layer structure. The attenuation in the transmitting region suffers as the number of layers is increased. This can be attributed to absorption due to the polyimide layers.

Figure 26:
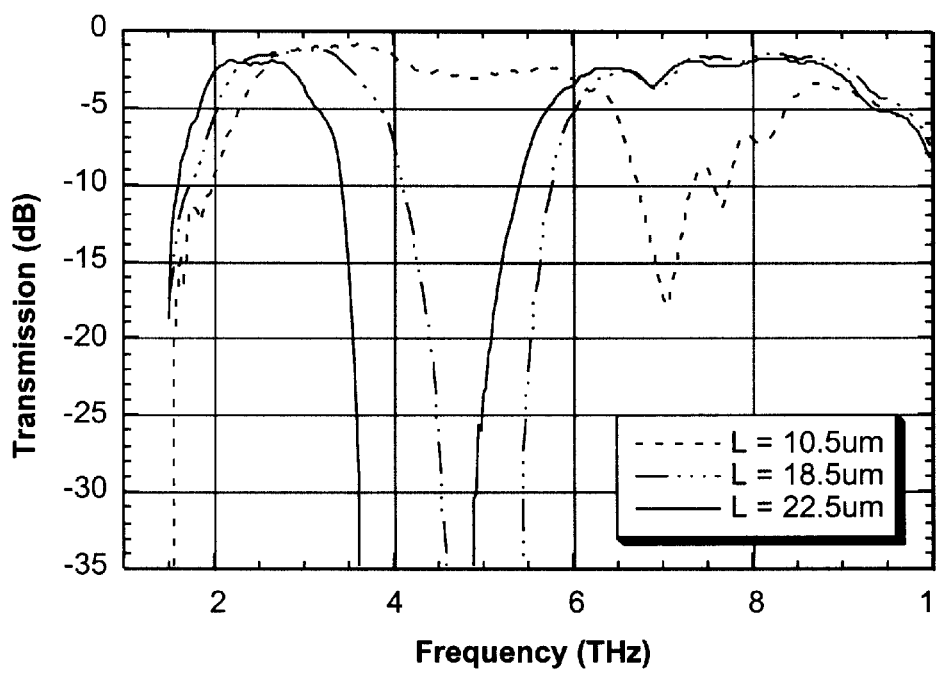
FIG. 26 is a graphical illustration showing the change in transmission characteristic as a function of cross-arm length of samples constructed in accordance with the teachings of the instant invention, the samples having a lattice constant equal to 16 micrometers, a line width equal to 2.5 micrometers, and interlayer separation equal to 11 micrometers.

Stopband characteristics of this band-reject structure were also studied as a function of the cross-arm length, L. It was observed that reducing the cross-arm length reduces the width of the gap, and if the cross arm length becomes too small, the second gap disappears completely. This effect can be seen in FIG. 26 which shows the transmission of three different band-reject filters with cross-arm lengths of 10.5 μm, 18.5 μm and 22.5 μm constructed in accordance with the teachings of the instant invention. It is also clear from the transmission results that reducing L reduces the width of the gap but increases its center frequency. The higher order band gap almost disappears for a cross arm length of 10.5 μm.

Figure 27:
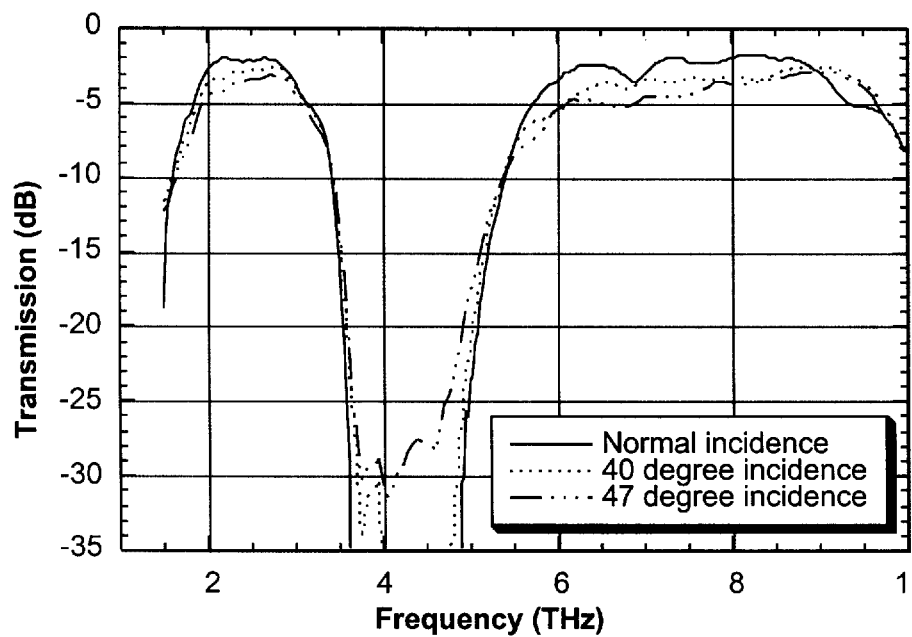
FIG. 27 is a graphical illustration showing the angle dependence of the transmission characteristic for a band reject filter constructed in accordance with the teachings of the instant invention and having a cross-arm length equal to 22.5 micrometers, a lattice constant equal to 16 micrometers, a line width equal to 2.65 micrometers, and interlayer separation equal to 11 micrometers.

The angular dependence of these band-reject filters was also measured. These measurement results are shown in FIG. 27 for the MPBG structure with L=22.5 μm. The band gap is virtually independent of the angle of incidence up to 40°. Because of the limitation in sample size, measurements were not conducted for higher angles of incidence. However, theoretical calculations predict that for angles of incidence up to 80°, the transmission characteristics should not change.

All measurements for the square grid and the modified grid structures were done using an unpolarized beam. However, theoretical studies show that for normal incidence, the cutoff frequency is independent of the two polarizations. As the incidence angle increases, the calculations show that there will be small differences between polarizations. However, even for angles as high as 80°, the difference in the cutoff frequencies of the two polarizations is less than 10%.

Figure 28:
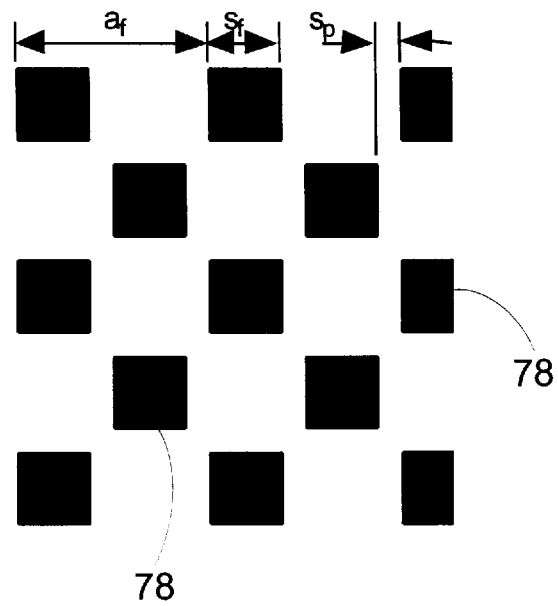
FIG. 28 is a top view schematic illustration of a square metallic patch array in accordance with the teachings of the instant invention used for each layer of the metallic photonic band gap structure to obtain the face-centered-cubic lattice or diamond lattice and having lateral lattice constant, $a_f$=20 micrometers, metallic square patch width, $s_f$=8 micrometers, and $s_p$=2 micrometers.
Figure 29:
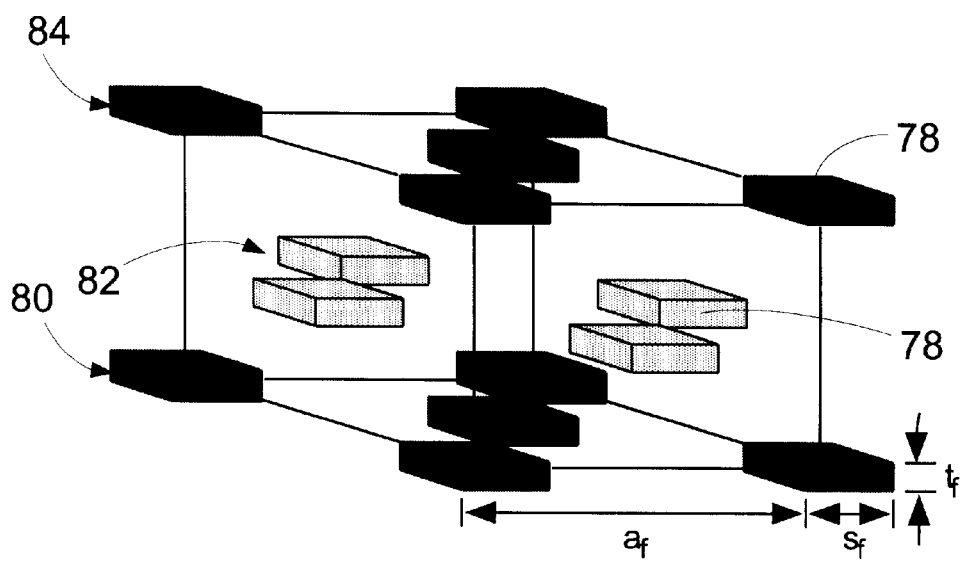
FIG. 29 is a simplified three-dimensional isometric view of the face-centered-cubic lattice geometry with lateral lattice constant, $a_f$=20 micrometers, metallic square patch width, $s_f$=8 micrometers, and metal thickness, $t_f$=0.2 micrometers.

The MPBG structures that are discussed below are somewhat inverse of the square grid patterns discussed above, although they are fabricated by the method of the instant invention. Instead of being an array of aperture elements, these "inverse" structures are arrays of patch elements. These MPBG structures consist of arrays of square metallic patches 78 located in a three-dimensional face-centered-cubic (FCC) lattice imbedded in a flexible polyimide dielectric. The three-dimensional FCC lattice is fabricated by the same layer-by-layer technique of the instant invention as described above. A top view of each layer is shown in FIG. 28. The lateral lattice constant of the array is $a_f$=20 $\mu$m with metallic patches of 8×8 $\mu$m and metal thickness, $t_f$=0.2 $\mu$m.

The FCC structures were fabricated by the method of the instant invention using alternating layers of metal patch arrays and polyimide spacers. The first metal layer 80 is deposited on a 5 $\mu$m polyimide layer. After depositing the 11 $\mu$m thick polyimide spacer layer the second metal patch array 82, shifted by half the lateral lattice constant is deposited on the spacer. The third metal layer 84 is aligned to the first layer 80 to obtain the FCC crystal lattice. The unit cell size is 20×20×22 $\mu$m. FIG. 28 shows the FCC lattice structure of the MPBG where the dark squares are the top 84 and bottom 80 layers and the middle layer 82 is shown in the lighter shade. Several sample array of 2×2 cm were fabricated to study how the geometry affected PBG properties.

Figure 30A:
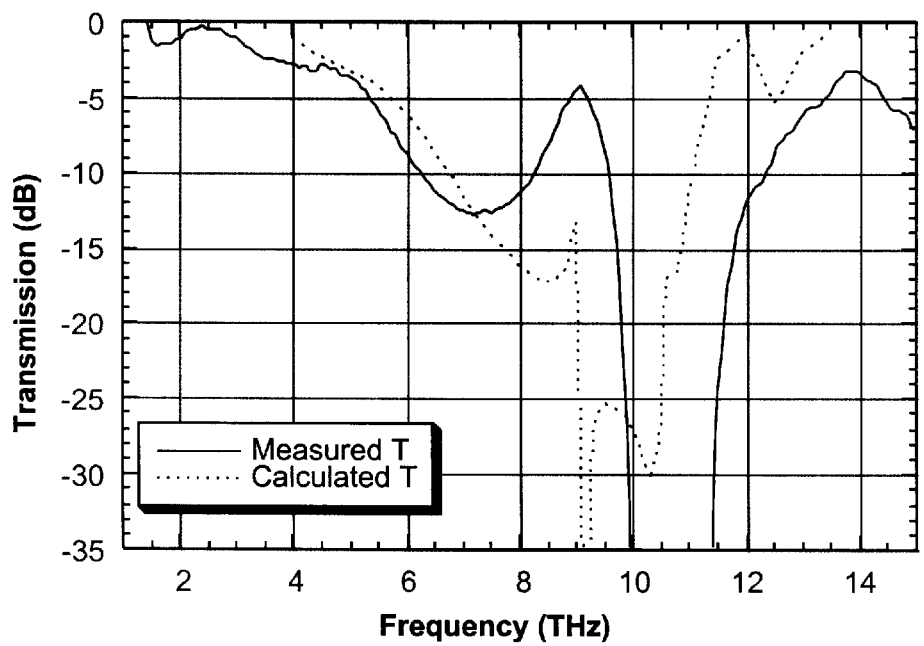
FIGS. 30A–B are graphical illustrations showing the transmission and reflection characteristics, respectively, (measured and predicted) of a one unit cell face-centered-cubic structure constructed in accordance with the teachings of the instant invention, and having a lateral lattice constant equal to 20 micrometers, a metallic square patch with equal to 8 micrometer and interlayer separation equal to 11 micrometers.
Figure 30B:
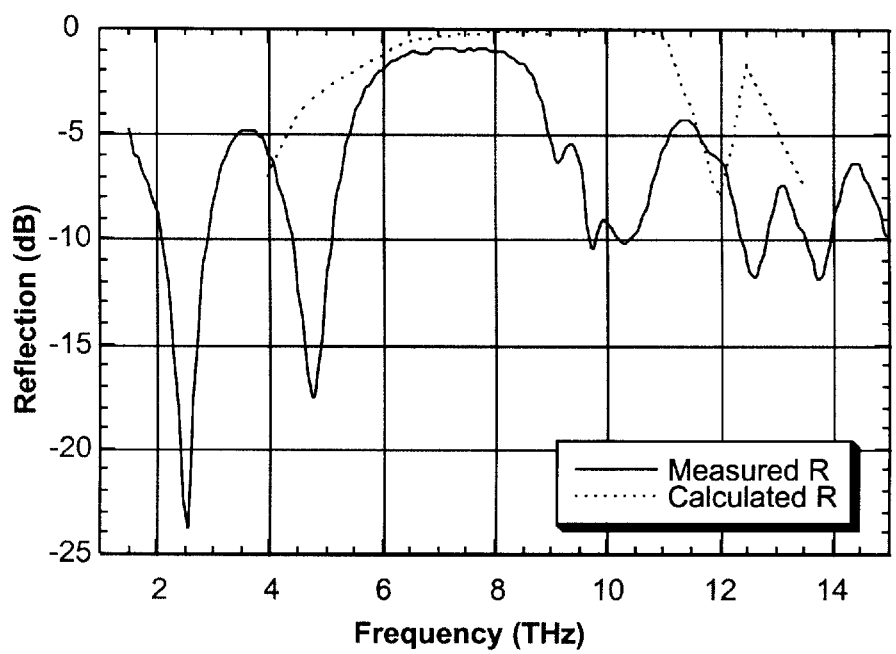

The critical frequencies of the filters depend on the lattice constant of the metallic layers and the inter-layer separation. The transmission spectrum of the FCC structure at normal incidence is shown in FIG. 30A, which shows two stopbands separated by a narrow band-pass region. The structure shows two stopbands centered around 7 and 11 THz with attenuation of more than 13 dB and 35 dB respectively. The measured values are in good agreement with predicted results. The lower pass-band region of the spectrum, below 4 THz, shows very good transmission characteristics with attenuation of only 1 dB. The reflection measurements in FIG. 30B show up to 85% reflection in the lower band gap region. The measurements show high attenuation near 10.5 THz due to the polyimide absorption band. Both the transmission and reflection measurements are close to the predicted calculations as shown in the figure. The interference fringes due to polyimide thickness show up very clearly at the lower end of the frequency spectrum in the reflection measurements where the reflection dip between the band gaps goes down to 25 dB between the stopbands.

Figure 31A:
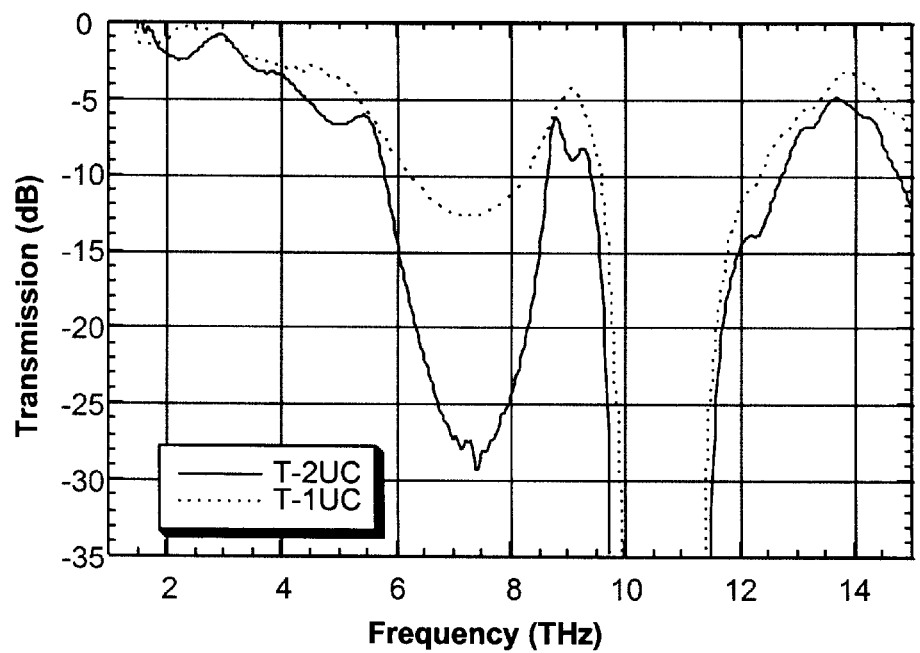
FIGS. 31A–B are graphical illustration showing the comparative measurements of 1- and 2- unit cell face-centered-cubic behavior of structures constructed in accordance with the teachings of the instant invention, and having a lateral lattice constant equal to 20 micrometers and metallic square patch wide equal to 8 micrometers, and interlayer separation equal to 11 micrometers.
Figure 31B:
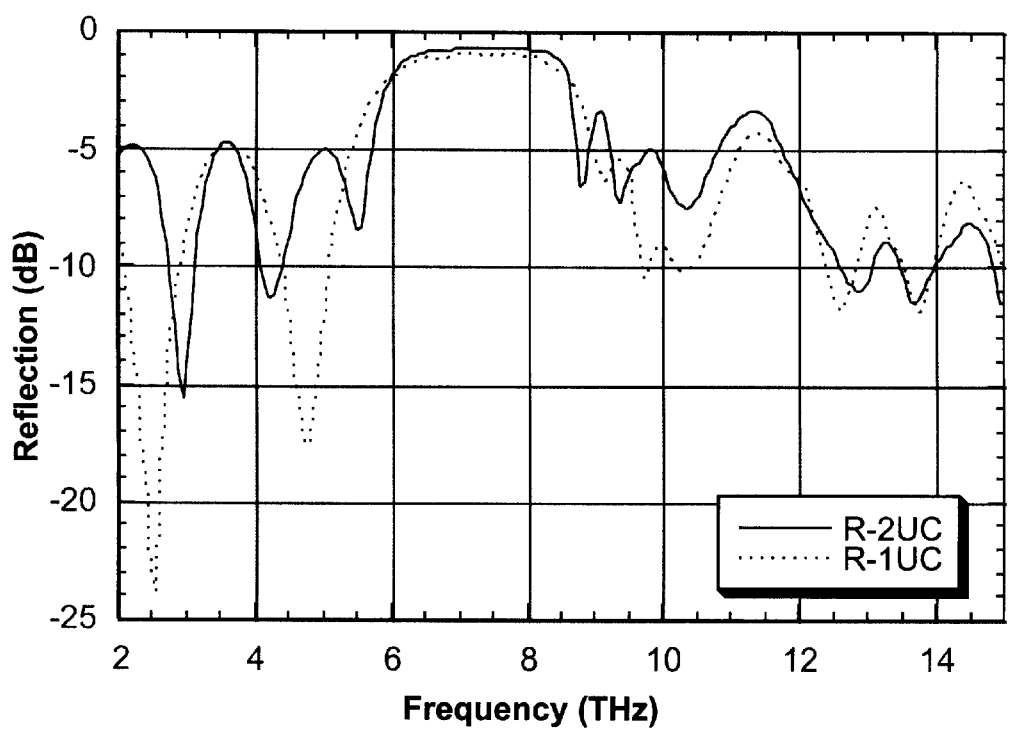

Another FCC sample was fabricated in accordance with the method of the instant invention with two unit cells consisting of five metal layers. Here, layers 1, 3 and 5 are aligned to each other and layers 2 and 4 are shifted by (½)$a_f$ in the x-axis. This sample shows the same center frequencies as the one-unit-cell structure but with much higher attenuation in the lower band gap region, as shown in FIG. 31A. The band gap centered around 7 THz has an attenuation of more than 25 dB. The reflection measurements show that the sample is nearly 90% reflective in the lower band gap region. FIG. 31B shows the reflection and transmission curves of the two unit cell structure as compared to the one unit cell FCC characteristic. The absorption band of polyimide near 10.5 THz is very clear in the reflection measurements.

Figure 32:
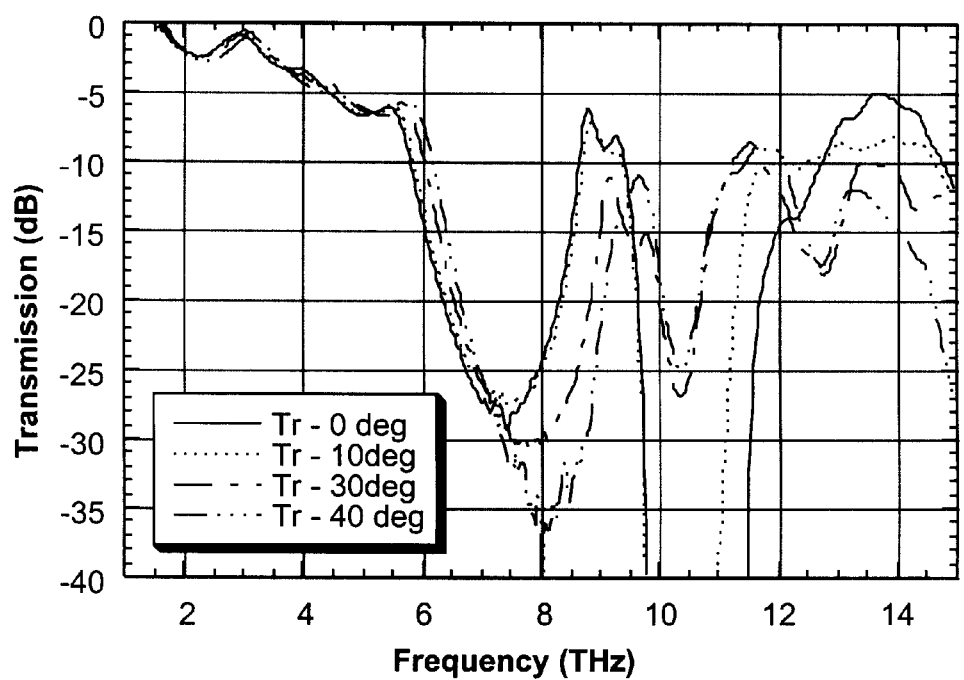
FIG. 32 is a graphical illustration showing the angle dependence of the two unit cell face-centered-cubic transmission characteristic of a structure constructed in accordance with the teachings of the instant invention, and having a lateral lattice constant equal to 20 micrometers, a metallic square patch equal to 8 micrometers, and interlayer separation equal to 11 micrometers.

FIG. 32 shows the transmission spectrum as a function of angle-of-incidence for the two-unit-cell FCC sample. With increasing incidence angle, the higher band gap narrows and eventually disappears entirely. The narrow band-pass region between the stopbands is highly attenuated, but the lower gap remains essentially intact.

Figure 33A:
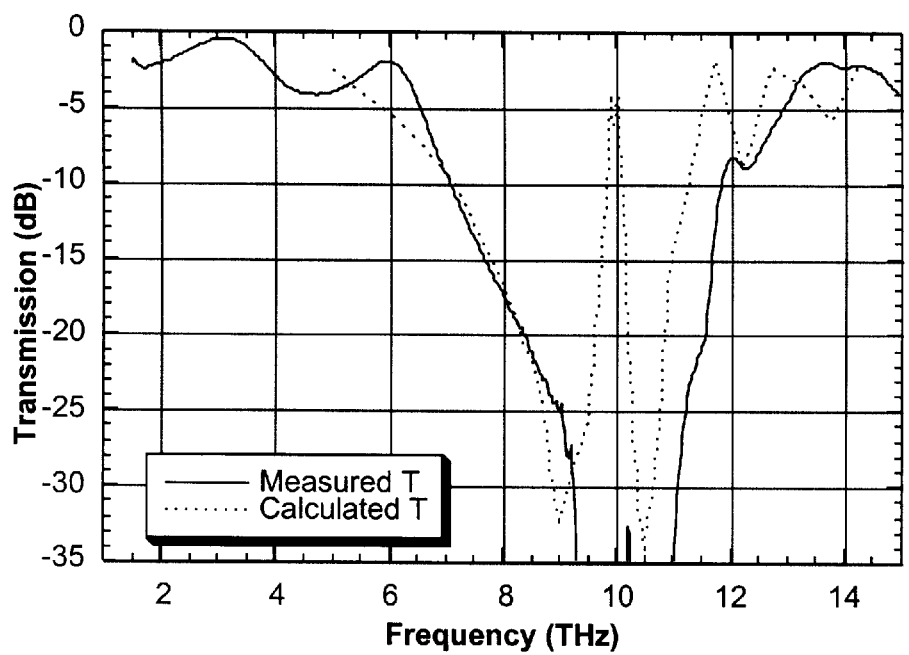
FIGS. 33A–B are graphical illustration showing the easured and calculated transmission and reflection easurements, respectively, on a face-centered-cubic structure constructed in accordance with the teachings of the instant invention and having an interlayer separation of 9 micrometers, a lateral lattice constant equal to 20 micrometer and a metallic square patch equal to 8 micrometers.
Figure 33B:
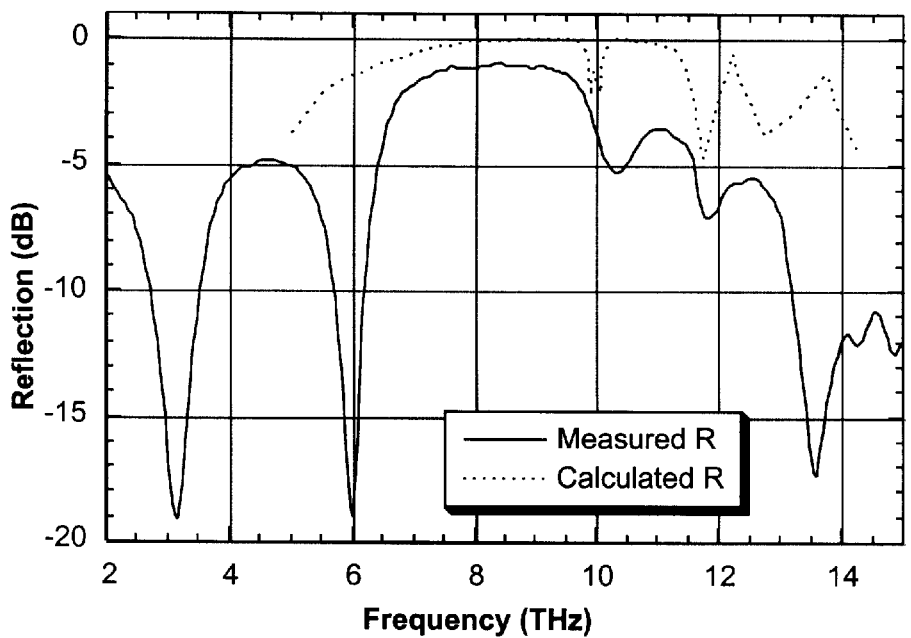

The effect of change in thickness of separation layers on the filter characteristic was also studied. Another FCC sample with an inter-layer separation of 9 $\mu$m was fabricated in accordance with the method of the instant invention, and the measured characteristics are shown in FIG. 33A. The theoretical results show that the narrow band-pass region between the stopbands moves to higher frequency from 9 THz to 10 THz. The measured transmission spectrum shows that the lower band edge also moves up from 5 THz to 6 THz. The narrow band pass region near 10 THz in the theoretical calculations is not visible in the measured spectrum because of the absorption peak of polyimide near 10 THz. The reflection measurement on this sample, illustrated in FIG. 33B, also shows very good reflectivity in the band gap region with attenuation of only 1 dB. The polyimide absorption near 10.5 THz can be seen clearly in the reflection measurements.

The effect of disturbing the periodicity of the FCC structure was also studied. Defects were introduced into the middle layer of a three-layer FCC structure constructed in accordance with the method of the instant invention. The defect layer 86 is shown in FIG. 34. Here, metal square patches 88 were removed from every other row of the periodic layer shown in FIG. 28. The blank squares 88 represent the metal patches that are missing in the defect layer. This defect layer is referred as defect "s" hereinbelow.

Figure 35A:
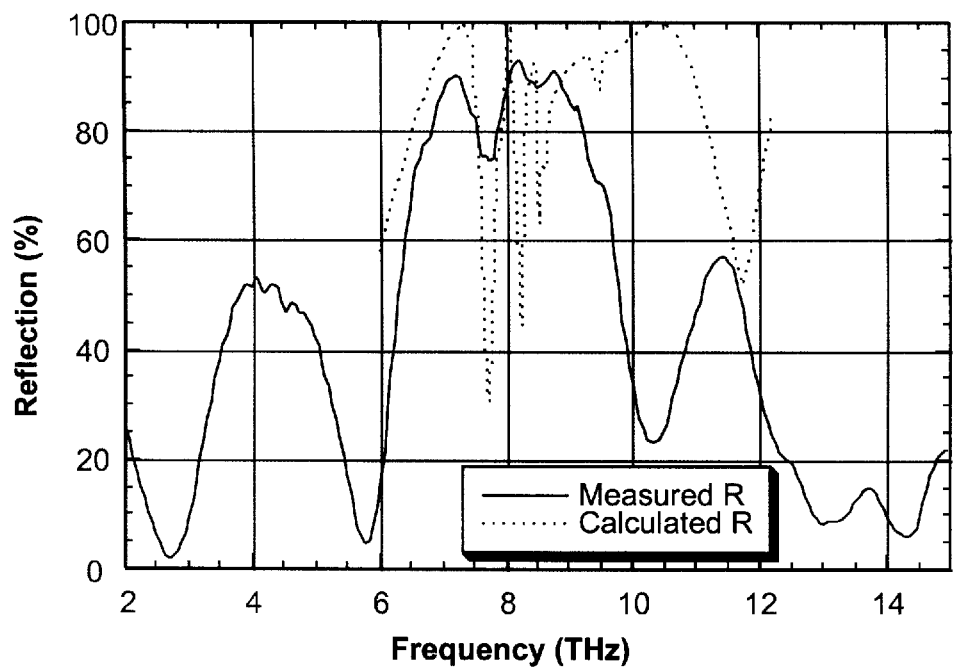
FIGS. 35A–B are graphical illustrations showing the measured and calculated results of a structure constructed in accordance with the teachings of the instant invention having a defect introduced in the middle layer of a one unit cell face-centered-cubic structure having a lateral lattice constant equal to 20 micrometers, a metallic square patch width equal to 8 micrometers, and interlayer separation equal to 11 micrometers.
Figure 35B:
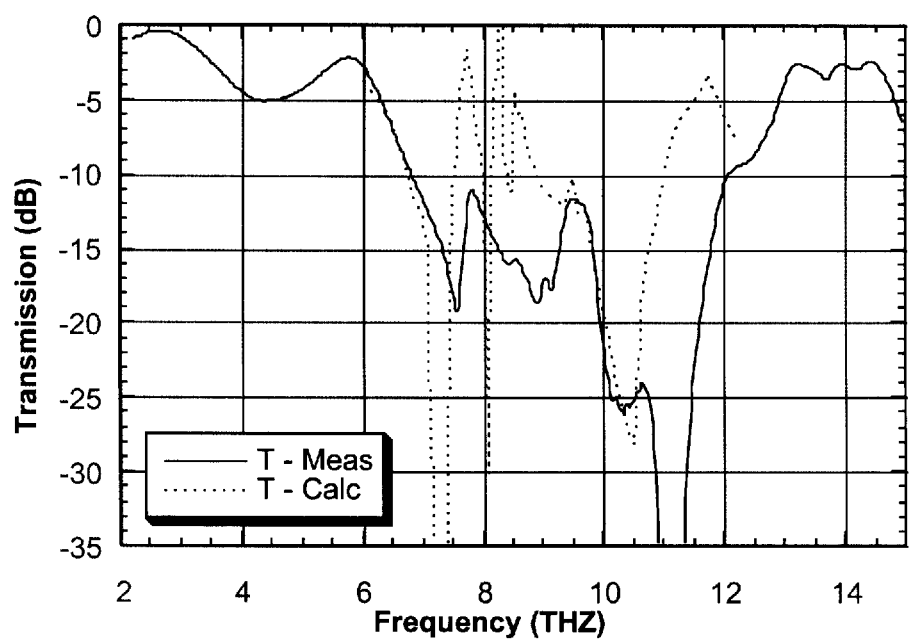

The measured and simulated spectra for FCCs with defects are shown in FIG. 35A and 35B. The calculations predict the presence of multiple defect peaks on the low frequency side of the band gap. However, only a single defect peak near 7.7 THz can be seen in the measurements. This is the strongest peak in the measured spectrum, showing a reflection dip down to 75% and transmission peak intensity of −11 dB. The other defect peaks are highly attenuated. This may be due to polyimide absorption.

The defect peak intensity is not very strong in the measurements shown in FIGS. 35A and 35B. In an effort to improve the defect peak intensity, one of the inter-layer separations was changed as illustrated by the structure 90 illustrated in FIG. 36. MPBG structures were fabricated using the method of the instant invention which not only contain defect patterns in the middle layer, but also have defects introduced by altering the separation between the middle 82 and the top 84 metal layer, $t_{m-t}$. Different samples were fabricated with varying $t_{m-t}$ as shown in Table 3 as illustrated in FIG. 37.

Figure 38A:
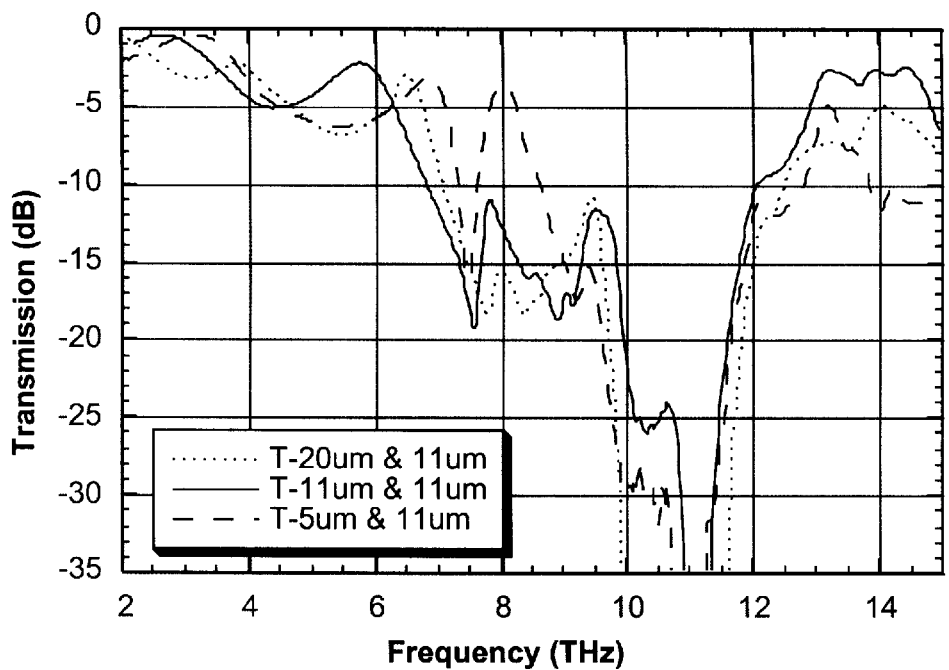
FIGS. 38A–B are graphical illustrations showing the transmission and reflection characteristics of a face-centered-cubic defect structure as a function of varying interlayer separations in accordance with the teachings of the instant invention, the first number on the graph label being indicative of the interlayer separation closer to the incoming beam.
Figure 38B:
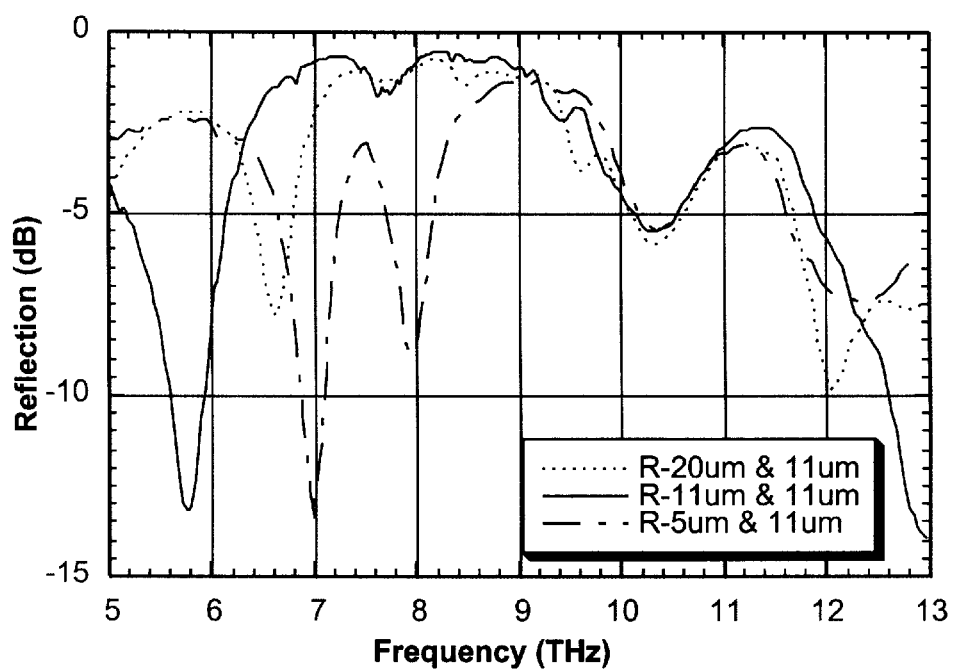

Here, $t_{b-m}$ is the inter-layer separation between the bottom 80 and the middle 82 metal patch arrays and $t_{m-t}$ is the inter-layer separation between the middle 82 and the top 84 metal patch array. All the samples have a top 46 and bottom 40 coating of 5 $\mu$m thick polyimide. FIG. 38A and 38B shows the measurement results of defect structures with varying values of $t_{m-t}$. The measurements shown in FIG. 38A and 38B were taken with top layer side of the sample facing the incident beam (see FIG. 9). FIG. 38A and 38B shows that reducing $t_{m-t}$ increases the peak intensity of the defect mode. The transmission spectrum shows that the defect peak intensity attenuation near 8 THz improves from 17 dB for 20 $\mu$m separation to 3 dB for 5 $\mu$m separation. The Q value of the defect peak also improves significantly.

The reflection measurements on these samples also show the best reflection dip for the inter-layer separation, $t_{m-t}$=5 $\mu$m with attenuation of about 8.5 dB near 8 THz. The graph shows that the lower band-edge of the structure moves to a higher frequency by both reducing or increasing the periodic inter-layer separation between the metal patch arrays.

Figure 39:
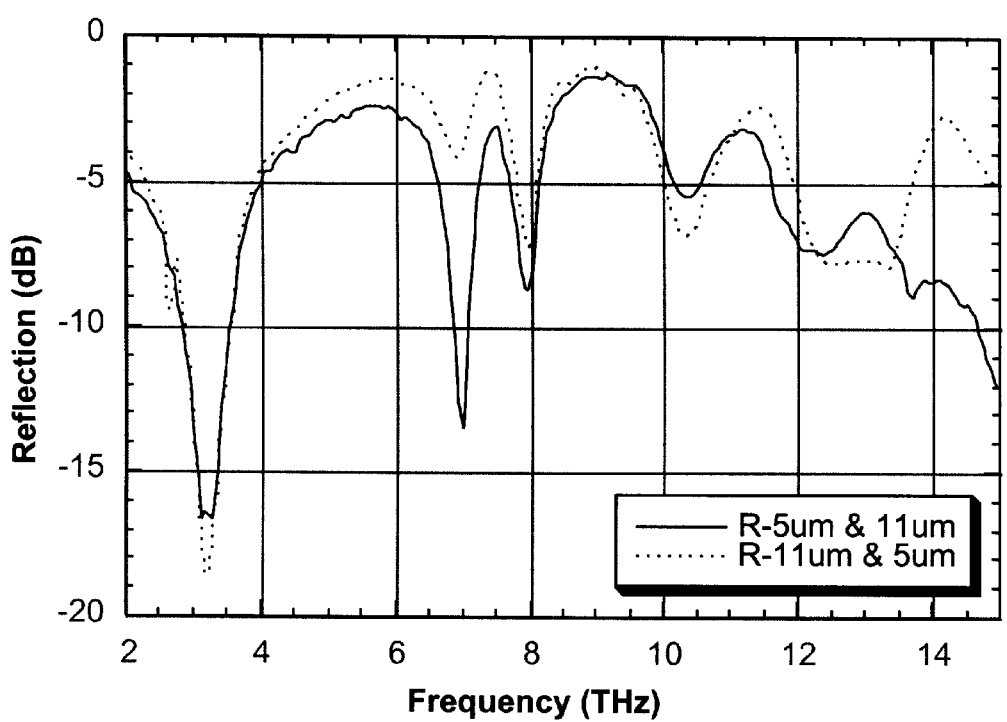
FIG. 39 is a graphical illustration showing reflection measurements conducted on both sides of the sample z listed in Table 3, the first set of numbers on the graph labels also being indicative of the interlayer separation that is facing the incoming beam.

The reflection measurements are sensitive to the sample surface which is closer to the incident beam. For samples with differing inter-layer separations, it was observed that the band-edge attenuation and the defect frequency attenuation are better when the samples are oriented so that the thinner separation layer is closer to the incident beam. The reflection measurements in FIG. 39 show that the defect peak intensities are significantly reduced for sample Z when the sample is flipped. The transmission measurements are not dependent on the sample side on which the beam is incident.

Figure 40A:
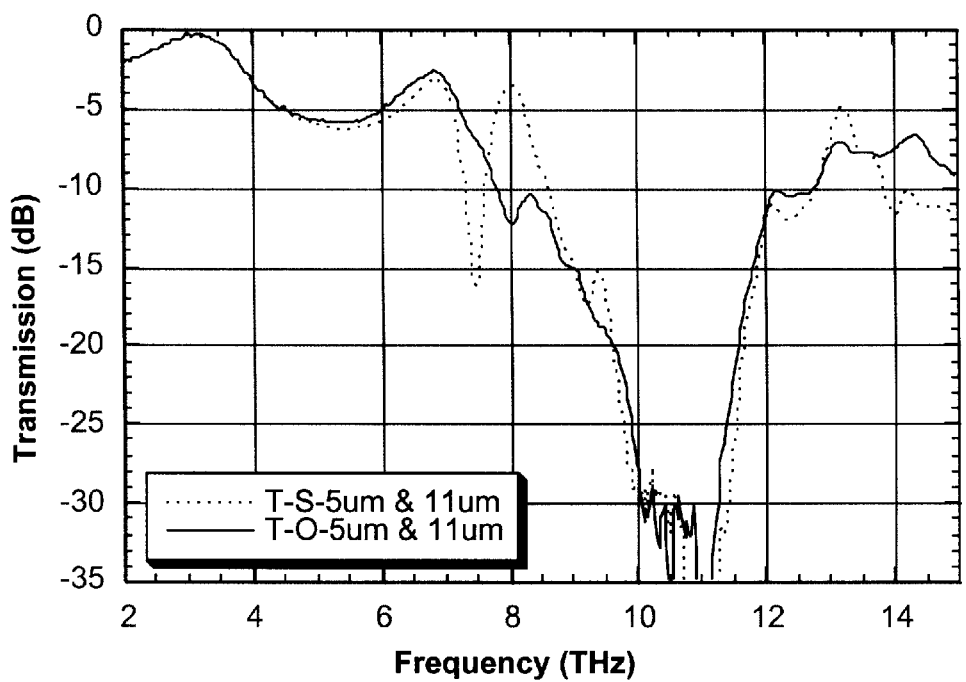
FIGS. 40A–B are graphical illustrations of the transmission and reflection characteristics of face-centered-cubic defect structures constructed in accordance with the teachings of the instant invention with defects "s" and "o"
Figure 40B:
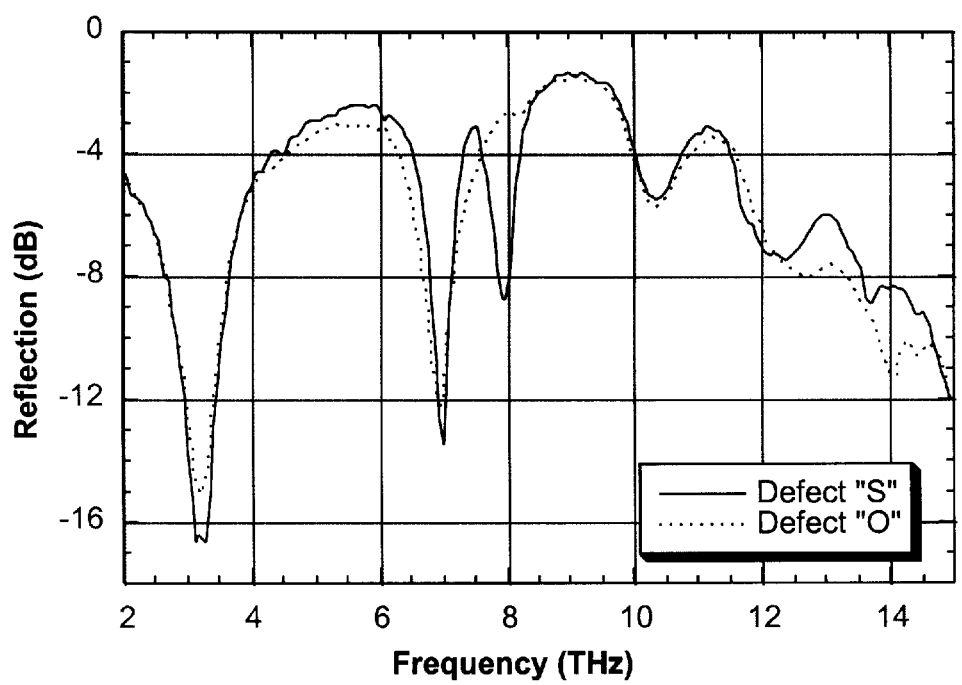

One more set of structures was studied with defect layer patterns having metal squares removed (see FIG. 34 from every fourth row. This defect pattern is referred to as defect "o" hereinbelow. For these samples, the defect layer was the middle layer of the MPBG structure, and the inter-layer separations are same as sample set Z, i.e. 11 $\mu$m and 5 $\mu$m. The measurements were taken with the 5 $\mu$m separation layer closer to the incoming beam. The defect frequency in the transmission and reflection measurement on these samples show less attenuation levels than the defect peak measurements on samples with defect "s". As shown in FIG. 40A and 40B, the defect peaks in the "o" sample have been almost completely smeared out—the perturbation to the periodicity is too weak to create a strong defect resonance.

Diamond lattice geometries were also studied. The fabrication strategy is unchanged. The diamond lattice requires five metal layers to form a unit cell, with each metal layer being shifted by ($\frac{1}{4}$)$a_f$ in x- and y-directions relative to its adjacent layers. This process is repeated up to the fifth layer which is aligned to the first metal layer. The same metal mask used for FCC is utilized for fabrication of diamond lattice also. The separation layers for the diamond lattice were each 5 $\mu$m thick, leading to a unit cell size of 20×20×20 $\mu$m.

Figure 41A:
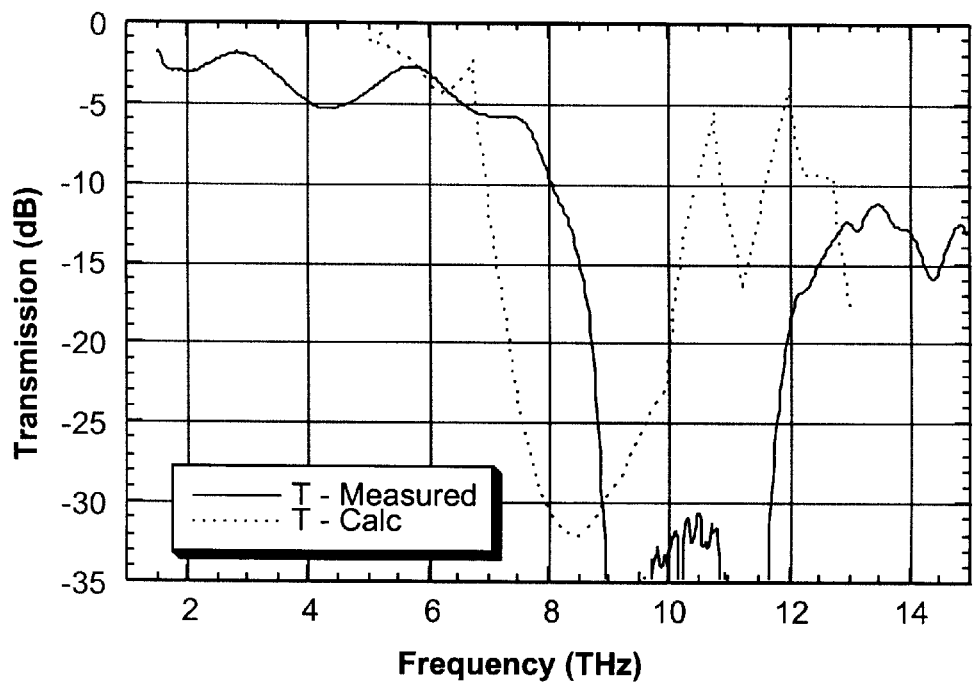
FIGS. 41A–B are graphical illustrations showing the transmission and reflection measurements and calculations for structures constructed in accordance with the teachings of the instant invention using the diamond lattice geometry having a lateral lattice constant equal to 20 micrometers, a metallic square patch width equal to 8 micrometers and interlayer separation equal to 5 micrometers.
Figure 41B:
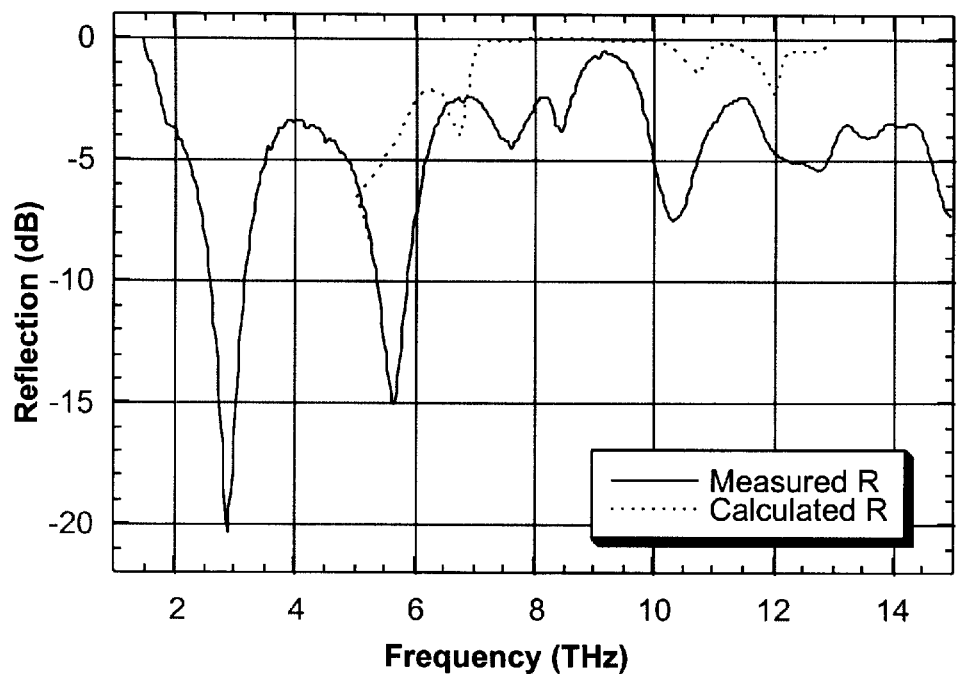

The measured and calculated spectra for the diamond structure are shown in FIG. 41A and 41B. The transmission spectrum shows a band gap from 8.5 to 12.5 THz with an attenuation of more than 35 dB in the band gap. The calculated results are close to the measurements. In the diamond structure the transmission does not recover very well near the higher edge of the band gap as compared to an FCC structure and shows an attenuation of more than 10 dB in the transmitting region. The reflection spectrum reaches up to 90% (<1 dB) in portion of the band gap region. The attenuation near the 10 THz region is due to the characteristic absorption peak of the polyimide.

All embodiments of the metallic PBG structures fabricated in accordance with the method of the instant invention maintain their transmission and reflection properties after considerable mechanical flexing. The structures were repeatedly rolled into a 8 mm diameter cylinder and then unrolled. No measurable changes in the transmission and reflection characteristics were observed after flexing the structure.

Rapid cooling of the samples also does not show any visible stress on the sample. Samples were dipped in liquid nitrogen and left there for 15 minutes. There were no observable cracks or other form of visual damage. The optical properties of the sample also did not change after the rapid temperature changes. This behavior makes these MPBG structures an excellent candidate for space applications.

The samples are very light-weight and compact. The characteristics of the structure do not change over a period of time. Measurements on a sample structure were taken after 18 months and it did not show any change in its characteristics.

High-pass structures show cutoff in the far-infrared region with very good attenuation (>35 dB) in the stopband region. The cutoff frequencies of the structures are a function of the dielectric constant of the polyimide, lattice constant of the metal grid and the inter-layer separation between the metal layers. By introducing a defect in the middle layer of the structure, a defect peak has been created in the stopband region. The frequency of the defect peak is a function of the defect size.

Band-reject filters show higher order gaps in addition to the lower band gap region present in the high-pass structure. This higher order band gap is a function of the metal bars sitting at the cross arms of the structures. It shows high attenuation level as good as the high-pass structure. The filter characteristics are relatively independent of the angle of incidence measured up to 50°.

Face-centered-cubic and diamond crystal lattices show a fundamentally different stopband behavior as compared to the interconnected metallic structures. These crystal geometries show very good reflection characteristic in the band gap region with reflections of nearly 90% in FCC case. The critical frequencies are a function of lattice constant and the inter-layer separations. Defect peaks can be created in the band gap region by introducing defect in the middle layers of the FCC or diamond structures.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. The details of the structure and architecture may be varied substantially without departing from the spirit of the invention, and the exclusive use of all modifications which come within the scope of the appended claims is reserved.

What is claimed is:

1. A method of manufacturing a flexible metallic photonic band gap structure operable in the infrared region, comprising the steps of:

spinning on a substrate a first layer of dielectric to a first thickness;

imidizing said first layer of dielectric;

forming a first metal pattern on said first layer of dielectric;

spinning on said metal pattern a second layer of dielectric to a second thickness;

imidizing said second layer of dielectric; and removing said substrate.

2. The method of claim 1, wherein said dielectric comprises a fluorinated polyamic acid polyimide.

3. (Once amended) The method of claim 1, wherein said steps of spinning on a first layer of dielectric and a second layer of dielectric are performed at a speed of at least approximately 2000 RPM for approximately 45 seconds.

4. The method of claim 3, wherein said steps of spinning on a first layer of dielectric and said step of spinning on a second layer of dielectric are performed at approximately 4000 RPM.

5. The method of claim 1, wherein said step of imidizing comprises the steps of:

softbaking said dielectric at approximately 120°–150° C. for approximately 30 minutes to produce partial imidization of said dielectric; and curing said dielectric at approximately 350°–4000° C. for approximately 30–15 minutes respectively to complete imidization and consolidation of said dielectric.

6. The method of claim 5, wherein said step of curing said dielectric comprises the steps of:

placing said dielectric in an oven at a temperature of approximately 200° C.;

ramping the temperature from approximately 200° C. to 350°–400° C.;

soaking said dielectric at approximately 350°–400° C. for approximately 30–15 minutes;

ramping the temperature from approximately 350°–400° C. to approximately 200° C.; and removing said dielectric from the oven.

7. The method of claim 1, wherein said step of forming a metal pattern on said first layer of dielectric comprises the steps of:
spinning on said first layer of dielectric a layer of photoresist;
exposing said layer of photoresist with a negative of said metal pattern with UV light;
hardening said layer of photoresist;
developing said pattern;
depositing a layer of metal on said layer of photoresist; and
removing metal from areas of said photoresist which were not patterned by said exposing step.

8. The method of claim 7, wherein said step of spinning on a layer of photoresist comprises the steps of:
spinning-on said photoresist at a speed of at least approximately 2000 RPM; and
baking at approximately 90° C. for approximately 30 minutes.

9. The method of claim 8, wherein said step of spinning-on is performed at approximately 3000+/−100 RPM for approximately 45 seconds.

10. The method of claim 7, wherein said step of depositing a layer of metal on said layer of photoresist comprises the steps of:
e-beam evaporating aluminum; and
depositing said aluminum at a rate not to exceed 50 angstroms per second.

11. The method of claim 10, wherein said step of depositing said aluminum is performed at a rate of approximately 7–10 angstroms per second to a thickness of approximately 2000 angstroms.

12. The method of claim 7, wherein said step of removing metal from areas of said photoresist which were not patterned by said exposing step comprises the step of dissolving said areas of said photoresist which were not patterned by said exposing step in an ultrasonic bath of acetone.

13. The method of claim 1, wherein said substrate is GaAs and wherein said step of removing said substrate comprises the step of soaking in a solution of citric acid and hydrogen peroxide of concentration approximately 4:1.

14. The method of claim 1, further comprising, before performing said step of removing said substrate, the steps of:
forming a second metal pattern on said second layer of dielectric;
spinning on said second metal pattern a third layer of dielectric to a third thickness; and
imidizing said third layer of dielectric.

15. The method of claim 14, wherein said second thickness is approximately equal to or less than approximately 11 micrometers.

16. The method of claim 14, wherein said second thickness exceeds approximately 11 micrometers, and wherein said step of spinning on said second layer of dielectric comprises the steps of:
spinning on a first sub-layer of dielectric of thickness not greater than approximately 11 micrometers;
softbaking said first sub-layer;
spinning on a second sub-layer of dielectric of thickness not greater than approximately 11 micrometers; and
repeating said spinning on, said softbaking, and said spinning on steps until a desired thickness is reached.

17. The method of claim 14, further comprising the steps of:
forming a third metal pattern on said third layer of dielectric;
spinning on said third metal pattern a fourth layer of dielectric to a fourth thickness; and
imidizing said fourth layer of dielectric.

18. The method of claim 17, further comprising the steps of:
forming a fourth metal pattern on said fourth layer of dielectric;
spinning on said fourth metal pattern a fifth layer of dielectric to a fifth thickness; and
imidizing said fifth layer of dielectric.

19. The method of claim 18, further comprising the steps of:
forming a fifth metal pattern on said fifth layer of dielectric;
spinning on said fifth metal pattern a sixth layer of dielectric to a sixth thickness; and
imidizing said sixth layer of dielectric.

20. The method of claim 17, wherein said step of spinning on said second layer of dielectric and said step of spinning on said third layer of dielectric are performed such that said second thickness and said third thickness are approximately equal.

21. The method of claim 17, wherein said step of spinning on said second layer of dielectric and said step of spinning on said third layer of dielectric are performed such that said second thickness and said third thickness are not equal.

22. The method of claim 17, wherein said step of spinning on said second layer of dielectric and said step of spinning on said third layer of dielectric are performed to control a parameter of filter characteristic.

23. The method of claim 17, wherein said step of forming a second metal pattern includes the step of introducing a defect in said metal pattern.

24. The method of claim 23, further comprising the step of adjusting a parameter of said defect to control a parameter of filter characteristic.

25. The method of claim 17, wherein said step of forming a first metal pattern, said step of forming a second metal pattern, and said step of forming a third metal pattern each include the step of introducing a defect in said metal pattern.

26. The method of claim 25, further comprising the steps of adjusting a parameter of said defects to control a parameter of filter characteristic.

27. A method of manufacturing a flexible metallic photonic band gap structure, comprising the steps of:
providing a GaAs substrate;
applying a bottom encapsulation layer of polyimide dielectric to said substrate;
forming a first metal pattern on said bottom encapsulation layer;
applying a first polyimide dielectric separation layer on said first metal pattern;
forming a second metal pattern on said first separation layer;
applying a second polyimide dielectric separation layer on said second metal pattern;
forming a third metal pattern on said second separation layer;
applying a top encapsulation layer of polyimide dielectric on said third metal pattern; and removing said substrate from said bottom encapsulation layer, resulting in the flexible metallic photonic band gap structure.

28. The method of claim 27, wherein said step of applying said bottom encapsulation layer and said step of applying said top encapsulation layer comprise the steps of:

spinning on said dielectric at approximately 4000 RPM for approximately 45 seconds;

softbaking said dielectric at approximately 120°–150° C. for approximately 30 minutes;

placing said dielectric in an oven at a temperature of approximately 200° C.;

ramping the temperature from approximately 200° C. to 350°–400° C.;

soaking said dielectric at approximately 350°–400° C. for approximately 30–15 minutes;

ramping the temperature from approximately 350°–400° C. to approximately 200° C.; and removing said dielectric from the oven.

29. The method of claim 27, wherein said step of applying said first dielectric separation layer and said step of applying said second dielectric separation layer comprise the steps of:

spinning on said dielectric at a predetermined speed based on a desired thickness of said layer for approximately 45 seconds;

softbaking said dielectric at approximately 120°–150° C. for approximately 30 minutes;

placing said dielectric in an oven at a temperature of approximately 200° C.;

ramping the temperature from approximately 200° C. to 350°–400° C.;

soaking said dielectric at approximately 350°–400° C. for approximately 30–15 minutes;

ramping the temperature from approximately 350°–400° C. to approximately 200° C.; and removing said dielectric from the oven.

30. The method of claim 27, wherein said steps of forming a first metal pattern, of forming a second metal pattern, and of forming a third metal pattern comprise the steps of:

spinning on a layer of photoresist;

exposing said layer of photoresist with a negative of said metal pattern with UV light;

hardening said layer of photoresist;

developing said pattern;

depositing a layer of aluminum on said layer of photoresist by e-beam evaporation at a rate of approximately 7–10 angstroms per second to a thickness of approximately 2000 angstroms; and dissolving areas of photoresist which were not patterned by said exposing step in an ultrasonic acetone bath to remove metal deposed therefrom.

31. The method of claim 27, wherein said step of removing said substrate from said bottom encapsulation layer comprises the step of dissolving the GaAs substrate in a solution of citric acid and hydrogen peroxide.

32. The method of claim 27, wherein said step of forming a second metal pattern on said first separation layer includes the step of introducing a defect in said metal pattern.

33. The method of claim 32, further comprising the step of adjusting a parameter of said defect to control a parameter of filter characteristic.

34. The method of claim 27, wherein said steps of forming a first metal pattern, of forming a second metal pattern, and of forming a third metal pattern include the step of introducing a defect in said metal pattern.

35. The method of claim 34, further comprising the step of adjusting a parameter of said defect to control a parameter of filter characteristic.

36. The method of claim 27, wherein said step of applying said first dielectric separation layer and said step of applying said second dielectric separation layer are performed to control a parameter of filter characteristic.

37. The method of claim 36, wherein said step of applying said first dielectric separation layer and said step of applying said second dielectric separation layer are performed such that said first dielectric separation layer and said second dielectric separation layer are of unequal thicknesses.

38. The method of claim 27, further comprising the step of adjusting critical frequencies of the metallic photonic band gap structure by varying spatial periodicity of said metal patterns and interlayer separation thereof.

* * * * *